US012722355B2

(12) United States Patent
Chowdhury et al.

(10) Patent No.: US 12,722,355 B2
(45) Date of Patent: Sep. 1, 2026

(54) SILICA WET GEL AND AEROGEL

(71) Applicant: Cardinal CG Company, Eden Prairie, MN (US)

(72) Inventors: Reaz Ahmed Chowdhury, Middleton, WI (US); Mohammad Arifuzzaman, Middleton, WI (US); Kellen Kitzman, Middleton, WI (US); Kari B. Myli, Sauk City, WI (US)

(73) Assignee: Cardinal CG Company, Eden Prairie, MN (US)

( * ) Notice: Subject to any disclaimer, the term of this patent is extended or adjusted under 35 U.S.C. 154(b) by 509 days.

(21) Appl. No.: 18/181,342

(22) Filed: Mar. 9, 2023

(65) Prior Publication Data

US 2023/0286810 A1 Sep. 14, 2023

Related U.S. Application Data

(60) Provisional application No. 63/318,165, filed on Mar. 9, 2022.

(51) Int. Cl.

| | |
|---|---|
| ***B32B 5/18*** | (2006.01) |
| ***B32B 17/06*** | (2006.01) |
| ***C01B 33/154*** | (2006.01) |
| ***C01B 33/155*** | (2006.01) |
| ***C01B 33/158*** | (2006.01) |

(52) U.S. Cl.

CPC .............. *B32B 5/18* (2013.01); *B32B 17/066* (2013.01); *C01B 33/1546* (2013.01); *C01B 33/155* (2013.01); *C01B 33/1585* (2013.01); *B32B 2250/40* (2013.01); *B32B 2266/057* (2016.11); *B32B 2266/126* (2016.11); *B32B 2307/304* (2013.01); *B32B 2307/414* (2013.01);

(Continued)

(58) Field of Classification Search

CPC ..... B32B 5/18; B32B 17/066; B32B 2250/40; B32B 2266/057; B32B 2266/126; B32B 2307/304; B32B 2307/414; B32B 2419/00; B32B 7/05; C01B 33/1546; C01B 33/155; C01B 33/1585; C01P 2006/32; C01P 2006/60; E06B 3/66314; E06B 3/6715; Y02A 30/249; Y02B 80/22

See application file for complete search history.

(56) References Cited

U.S. PATENT DOCUMENTS

| | | | |
|---|---|---|---|
| 3,672,833 | A | 6/1972 | Jean et al. |
| 4,327,065 | A | 4/1982 | Von Dardel et al. |

(Continued)

FOREIGN PATENT DOCUMENTS

| | | | |
|---|---|---|---|
| AU | 688208 | B2 | 3/1998 |
| CN | 102180603 | A | 9/2011 |

(Continued)

OTHER PUBLICATIONS

Sinko et al. (Influence of Chemical Conditions on the Nanoporous Structure of Silicate Aerogels, Materials, 2010) (Year: 2010).*

(Continued)

*Primary Examiner* — Anthony J Zimmer
*Assistant Examiner* — Logan Laclair
(74) *Attorney, Agent, or Firm* — Fredrikson & Byron, P.A.

(57) ABSTRACT

The invention provides silica wet gel, silica aerogel, and methods that can be used to form an enhanced silica aerogel sheet having fewer optical defects along with other desirable properties.

17 Claims, 13 Drawing Sheets

(52) U.S. Cl.
CPC ....... *B32B 2419/00* (2013.01); *C01P 2006/32* (2013.01); *C01P 2006/60* (2013.01)

(56) References Cited

U.S. PATENT DOCUMENTS 4,402,927 A 9/1983 Von Dardel et al.
4,610,863 A 9/1986 Tewari et al.
4,667,417 A 5/1987 Graser et al.
5,294,480 A 3/1994 Mielke et al.
5,395,805 A 3/1995 Droege et al.
5,409,683 A 4/1995 Tillotson et al.
5,496,527 A 3/1996 Yokogawa et al.
5,587,107 A 12/1996 Schwertfeger et al.
5,795,557 A 8/1998 Pajonk et al.
5,830,387 A 11/1998 Yokogawa et al.
5,958,363 A 9/1999 Coronado
6,197,270 B1 3/2001 Sonoda et al.
6,627,305 B1 9/2003 Deane et al.
6,656,527 B1 12/2003 Gessner et al.
6,740,416 B1 * 5/2004 Yokogawa .............. C03C 17/36 428/209
7,074,880 B2 7/2006 Rhine et al.
7,384,988 B2 6/2008 Gauthier et al.
7,560,062 B2 7/2009 Gould et al.
7,771,609 B2 8/2010 Leventis et al.
8,029,871 B2 10/2011 Nakayama et al.
8,142,856 B2 3/2012 Chevalier
8,202,502 B2 6/2012 Floess et al.
8,258,251 B2 9/2012 Meador et al.
8,298,622 B2 10/2012 Nakayama et al.
8,889,749 B2 11/2014 Suh et al.
8,906,973 B2 12/2014 Rhine et al.
9,068,346 B1 6/2015 Lu et al.
9,764,301 B2 9/2017 Joshi et al.
9,834,446 B2 12/2017 Kim et al.
9,862,614 B2 1/2018 Oh et al.
10,294,111 B2 5/2019 Kim et al.
10,336,621 B2 7/2019 Kim et al.
10,401,876 B1 9/2019 Coleman
10,421,253 B2 9/2019 Van Overmeere et al.
10,563,035 B2 2/2020 Steiner, III et al.
10,717,824 B2 7/2020 Chintapalli et al.
10,800,883 B1 10/2020 Vivod et al.
10,875,776 B2 12/2020 Sakatani et al.
10,889,501 B2 1/2021 Huang et al.
11,053,127 B2 7/2021 Pashaei Soorbaghi
11,170,750 B2 11/2021 Wang et al.
11,220,434 B2 1/2022 Kim et al.
2002/0102674 A1 8/2002 Anderson
2005/0100728 A1 5/2005 Ristic-Lehmann et al.
2006/0246806 A1 11/2006 Rhine et al.
2006/0247349 A1 11/2006 Kollmann et al.
2006/0286360 A1 12/2006 Rhine et al.
2007/0148435 A1 6/2007 Meredith et al.
2008/0081014 A1 4/2008 Ahn et al.
2008/0258065 A1 10/2008 Banks
2010/0080949 A1 4/2010 Ou et al.
2010/0144962 A1 6/2010 Jana et al.
2011/0223329 A1 9/2011 Meredith et al.
2012/0128958 A1 5/2012 Zeng et al.
2013/0136664 A1 5/2013 Bono et al.
2013/0170218 A1 7/2013 Mazurek et al.
2013/0202890 A1 8/2013 Kong et al.
2014/0065329 A1 3/2014 Showers
2014/0323589 A1 10/2014 Lzr et al.
2014/0350134 A1 11/2014 Rodman et al.
2015/0004087 A1 1/2015 Zettl et al.
2016/0096949 A1 4/2016 Evans et al.
2016/0160557 A1 6/2016 Kim et al.
2016/0266288 A1 9/2016 Ozcan
2018/0093456 A1 4/2018 Van Overmeere et al.
2018/0112054 A1 4/2018 Steiner, III et al.
2018/0264784 A1 9/2018 Murofushi et al.
2019/0143290 A1 5/2019 Bertino et al.
2019/0333490 A1 10/2019 Wang et al.
2020/0181347 A1 6/2020 Asefa et al.
2020/0231452 A1 7/2020 Takayasu et al.
2020/0255295 A1 8/2020 Kim et al.
2020/0353437 A1 11/2020 Bertino et al.
2020/0407231 A1 12/2020 Choi et al.
2021/0039954 A1 2/2021 Numrich et al.
2021/0207428 A1 7/2021 Pilon et al.
2021/0269317 A1 9/2021 Hsieh et al.
2022/0042370 A1 2/2022 Burrows
2022/0315431 A1 10/2022 Zenitani et al.
2023/0286812 A1 9/2023 Chowdhury et al.
2023/0286813 A1 9/2023 Chowdhury et al.
2023/0416099 A1 12/2023 Chowdhury et al.
2024/0199835 A1 6/2024 Chen et al.
2024/0351313 A1 10/2024 Chowdhury et al.
2024/0351314 A1 10/2024 Chowdhury et al.
2024/0351326 A1 10/2024 Chowdhury et al.
2024/0351890 A1 10/2024 Chowdhury et al.
2024/0351891 A1 10/2024 Chowdhury et al.
2024/0359451 A1 10/2024 Chowdhury et al.
2024/0367429 A1 11/2024 Chowdhury et al.
2024/0367983 A1 11/2024 Chowdhury et al.
2025/0326203 A1 10/2025 Chowdhury et al.
2025/0326219 A1 10/2025 Chowdhury et al.
2025/0326220 A1 10/2025 Chowdhury et al.
2025/0326221 A1 10/2025 Chowdhury et al.
2025/0326647 A1 10/2025 Chowdhury et al.
2025/0326648 A1 10/2025 Chowdhury et al.
2025/0326649 A1 10/2025 Chowdhury et al.
2025/0326650 A1 10/2025 Chowdhury et al.

FOREIGN PATENT DOCUMENTS

CN 202706291 U 1/2013
CN 104898295 A 9/2015
CN 105201355 A 12/2015
CN 204936377 U 1/2016
CN 105441036 A 3/2016
CN 205117117 U 3/2016
CN 205117118 U 3/2016
CN 106082697 A 11/2016
CN 205736249 U 11/2016
CN 206589417 U 10/2017
CN 107381581 A 11/2017
CN 206983435 U 2/2018
CN 207190441 U 4/2018
CN 108060874 A 5/2018
CN 110902690 A 3/2020
CN 111101819 A 5/2020
CN 112174144 A 1/2021
CN 112299428 A 2/2021
CN 112499635 A 3/2021
CN 114477195 A 5/2022
CN 114538453 A 5/2022
CN 115057447 A 9/2022
DE 3917629 A1 12/1989
DE 102006050117 A1 4/2008
EP 193717 A2 9/1986
EP 653377 A1 5/1995
EP 849220 A1 6/1998
EP 1153739 A1 11/2001
EP 1414266 A2 4/2004
EP 3112773 A1 1/2017
EP 3671291 A1 6/2020
GB 2241468 A 9/1991
JP H06135712 A 5/1994
JP 11172000 A 6/1999
JP 2004256628 A 9/2004
JP 2005132641 A 5/2005
KR 1020100055248 A 5/2010
KR 101790390 B1 10/2017
WO 9203378 A1 3/1992
WO 2008144634 A2 11/2008
WO 2010080059 A1 7/2010
WO 2010080060 A1 7/2010
WO 2014019809 A1 2/2014
WO 2014126490 A1 8/2014
WO 2015061075 A1 4/2015
WO 2015128364 A1 9/2015

(56) References Cited

FOREIGN PATENT DOCUMENTS

| | | |
|---|---|---|
| WO | 2017090686 A1 | 6/2017 |
| WO | 2017147463 A1 | 8/2017 |
| WO | 2017185009 A1 | 10/2017 |
| WO | 2017222733 A2 | 12/2017 |
| WO | 2019241604 A1 | 12/2019 |
| WO | 2020005965 A1 | 1/2020 |
| WO | 2020220138 A1 | 11/2020 |
| WO | 2024220696 A2 | 10/2024 |
| WO | 2024220699 A1 | 10/2024 |
| WO | 2024220701 A1 | 10/2024 |

OTHER PUBLICATIONS

Tabata et al. (Large-area silica aerogel for use as Cherenkov radiators with high refractive index, developed by supercritical carbon dioxide drying, The Journal of Supercritical Fluids, 2016) (Year: 2016).*

European Patent Office, "Extended European Search Report", From Application No. 25177216.6, Dated Sep. 2, 2025, p. 8.

European Patent Office, "Extended European Search Report", From Application No. 25177224.0, Dated Sep. 2, 2025, p. 8.

Dieudonne et al "Transformation of nanostructure of silica gels during drying", Journal of Non-Crystalline Solids, vol. 262, Feb. 1, 2000, pp. 155-161.

International Searching Authority "International Search Report and Written Opinion" From Application No. PCT/US2023/064059, Mailed Jul. 11, 2023, p. 16.

Parale et al., "Flexible and Transparent Silica Aeroegels: An Overview" Journal of the Korean Ceramic Society vol. 54, No. 3, Published May 22, 2017, pp. 184-199.

Tabata "Transparent tiles of Silica Aerogels for High-Energy Physics" Feb. 14, 2019, p. 31.

Tabata et al "Hydrophobic silica aerogel production at KEK", Nuclear Instruments & Methods in Physics Research, A, vol. 668, Dec. 5, 2011, pp. 64-70.

Cao et al., "Improving the visible transparency of silica aerogels", Journal of Non-Crystalline Solids, North-Holland Physics Publishing, vol. 176, No. 1, Oct. 2, 1994, pp. 18-25.

Duraes et al., "Effect of the Drying Conditions on the Microstructure of Silica Based Xerogels and Aerogels," Journal of Nanoscience and Nanotechnolgy, vol. 12, 2012, pp. 6828-6834.

Haimer et al., "Silica modified cellulosic aerogels," Cellulose, Feb. 2010, 8 pages.

Hasan et al., "Structural, out-gassing and nanomechanical properties of super-hydrophobic transparent silica aerogels developed by ambient pressure drying for space application," Bull Mater Sci (2020) 43: 287.

Krieble et al., "The Hydrolytic Cleavage of Methyl and Chloromethyl Siloxanes," The Research Laboratory, General Electric Company, Nov. 1946, pp. 2291-2294.

Mahadik et al., "Monolithic and shrinkage-free hydrophobic silica aerogels via new rapid supercritical extraction process," The Journal of Supercritical Fluids (2016), Sep. 2, 2015, pp. 84-91.

Omranpour et al., "Mechanical properties improvement of silica aerogel through aging: Role of solvent type, time and temperature," AIP Conference Proceedings 1593 (2014), May 15, 2014, pp. 298-302.

Parale et al., "Hydrophobic TiO2—SiO2 composite aerogels synthesized via in situ epoxy-ring opening polymerization and sol-gel process for enhanced degradation activity," Ceramics International (2020), 46(4), pp. 4939-4946.

Parale et al., "Sol-gel preparation of PTMS modified hydrophobic and transparent silica coatings," J Porous Matter (2013) 20, Nov. 2, 2012, pp. 733-739.

Pisal et al., "Development of hydrophobic and optically transparent monolithic silica aerogels for window panel applications," Crossmark J Porous Mater (2017) 24, Oct. 26, 2016, pp. 685-695.

Rao et al, "Effect of methyltrimethoxysilane as a co-precursor on the optical properties of silica aerogels," Journal of Non-Crystalline Solids (2001), 285, Issues 1-3, pp. 202-209.

Ren et al., "One-step fabrication of transparent hydrophobic silica aerogels via in situ surface modification in drying process," J Sol-Gel Sci Technol (2016) 80, pp. 635-641.

Scherer et al., "Effect of Shrinkage on the Modulus of Silica Gel," Nov. 17, 1988, Journal of Non-Crystalline Solids 109 (1989), pp. 183-190.

Shafi et al., "Superhydrophobic, enhanced strength and thermal insulation silica aerogel/glass fiber felt based on methyltrimethoxysilane precursor and silica gel impregnation." Journal of Porous Materials, 2019, 8 pages.

Silva et al., "Acid and Base Catalysts in the Hybrid Silica Sol-Gel Process," Journal of Colloid and Interface Science 195, May 12, 1997, pp. 381-387.

Smitha et al., "Synthesis of biocompatible hydrophobic silica-gelatin nano-hybrid by sol-gel process," Colloids and Surfaces B: Biointerfaces 55, Nov. 17, 2006, pp. 38-43.

Smitha et al., "Transparent and Hydrophobic MTMS/GPTMS Hybrid Aerogel Monoliths and Coatings by Sol-Gel Method: A Viable Remedy for Oil-Spill Cleanup," ChemistrySelect (2018), 3, pp. 2989-2997.

Strobach et al., "Optically Transparent, Thermally Insulating and Soundproofing (OTTIS) Aerogel for High-efficiency Window Applications," Massachusetts Institute of Technology, Department of Mechanical Engineering (2020)—120 pages.

Su et al., "A review on the emerging resilient and multifunctional ceramic aerogels," Journal of Materials Science & Technology 75 (2021), Oct. 19, 2020, pp. 1-13.

Tabata et al., "Large-area silica aerogel for use as Cherenkov radiators with high refractive index, developed by supercritical carbon dioxide drying," The Journal of Supercritical Fluids (2016) 110, pp. 183-192.

Wei et al., "Transparent, hydrophobic composite aerogels with high mechanical strength and low high-temperature thermal conductivities," J. Phys. Chem. B (2008) 112, pp. 11881-11886.

Wong et al., "Mechanical and thermal properties of nanofibrillated cellulose reinforced silica aerogel composites," Microporous and Mesoporous Materials 217, 2015, pp. 150-158.

Yoda et al., "Supercritical drying media modification for silica aerogel preparation," Journal of Non-Crystalline Solids 248 (1999), Aug. 25, 1998, pp. 224-234.

Mahadik et al., "Recoverable and thermally stable superhydrophobic silica coating," J Sol-Gel Sci Technol (2012) 62, pp. 490-494.

Nadargi et al., "Methyltriethoxysilane: New precursor for synthesizing silica aerogels," Journal of Alloys and Compounds 467 (2009), pp. 397-404.

Rao et al, "Hydrophobic and physical properties of the ambient pressure dried silica aerogels with sodium silicate precursor using various surface modification agents," Applied Surface Science 253 (2007) pp. 6032-6040.

Rao et al., "Superhydrophobic silica aerogels based on methyltrimethoxysilane precursor", Journal of Non-Crystalline Solids 330, 2003, pp. 187-195.

Rao et al., "Effect of methyltrimethoxysilane as a synthesis component on the hydrophobicity and some physical properties of silica aerogels", Microporous and Mesoporous Materials, 30, 1999, pp. 267-273.

Pierre et al., "Chemistry of Aerogels and Their Applications", Chemistry Reviews, vol. 102, No. 11, 2002, pp. 4243-4265.

Sinko, "Influence of Chemical Conditions on the Nanoporous Structure of Silicate Aerogels". Materials 2010, 3, Published Jan. 26, 2010, pp. 704-740.

Ingale et al., "Physico-chemical properties of silica aerogels prepared from TMOS/MTMS mixtures", Journal Porous Mater 2011, 18:567-572, Published Sep. 4, 2010, p. 6.

Berardi et al., "The development of a monolithic aerogel glazed window for an energy retrofitting project", Applied Energy, 154, 2015, pp. 603-615.

Buratti et al., "Experimental performance evaluation of aerogel glazing systems", Applied Energy, 97, 2012, pp. 430-437.

(56) References Cited

OTHER PUBLICATIONS

Buttner et al., "Thermal Loss Coefficients of Low-Density Silica Aerogel Tiles", Solar Energy, vol. 40, No. 1, 1988, pp. 13-15.
Duer et al., "Monolithic Silica Aerogel in Superinsulating Glazings", Solar Energy, vol. 63, No. 4, 1998, pp. 259-267.
Iswar et al., "Dense and strong, but superinsulating silica aerogel", Acta Materialia, 213, 116959, May 9, 2021, p. 9.
Lei et al., "Tailoring structural and physical properties of polymethylsilsesquioxane aerogels by adjusting NH3 * H20 concentration", Microporous and Mesoporous Materials, 258, 2018, pp. 236-243.
Merli et al., "Acoustic measurements on monolithic aerogel samples and application of the selected solutions to standard window systems", Applied Acoustics, 142, 2018, pp. 123-131.
Schultz et al., "Evacuated Aerogel Glazings", Vacuum, 82, 2008, pp. 723-729.
Sisib Silicones, "Methyl Silicate 51", retrieved from <URL: http://www.powerchemical.net/silanes/5411.html>, retrieved Apr. 28, 2026, Published 2014, p. 2.
Yokogawa et al., "Hydrophobic silica aerogels", Journal of Non-Crystaline Solids, 186, 1995, pp. 23-19.
Zhao et al., "Theoretical and experimental investigation of haze in transparent aerogels", Optics Express, 27(4), Feb. 18, 2019, pp. A39-A50.
Rubin et al., "Transparent Silica Aerogels for Window Insulation", Solar Energy Materials, 7, 1983, pp. 393-400.
Rao et al., "Influence of Molar Rations of Precursor, Catalyst, Solvent and Water on Monolithicity and Physical Properties of TMOS Silica Aerogels", Journal of Sol-Gel Science and Technology, 3, 1994, pp. 205-217.
Tajiri et al., "Effects of Supercritical Drying Media on Structure and Properties of Silica Aerogel", Journal of Non-Crystalline Solids, 186, 1995, pp. 83-87.
Pajonk et al., "Optical Transmission Properties of Silica Aerogels Prepared from Polyethoxidisiloxanes", Journal of Non-Crystalline Solids, 210, 1997, pp. 224-231.
Pajonk, "Transparent Silica Aerogels", Journal Non-Crystalline Solids, 225, 1998, pp. 307-314.
Buratti et al., "Glazing Systems with Silica Aerogel for energy Savings in Buildings", Applied Energy, 98, Apr. 27, 2012, pp. 396-403.
Gao et al., "Synthesis and Characertization of Aerogel Glass Materials for Window Glazing Applications", Advances in Bioceramics and Porous Ceramics VII, 2015, pp. 141-150.

* cited by examiner 200A
preparing a first solution by mixing silicon alkoxide and solvent
205
preparing a second solution by mixing catalyst and water
210
mixing the first solution and the second solution to form a precursor material
215
allowing components of the precursor material to react to form a silica wet gel material
220

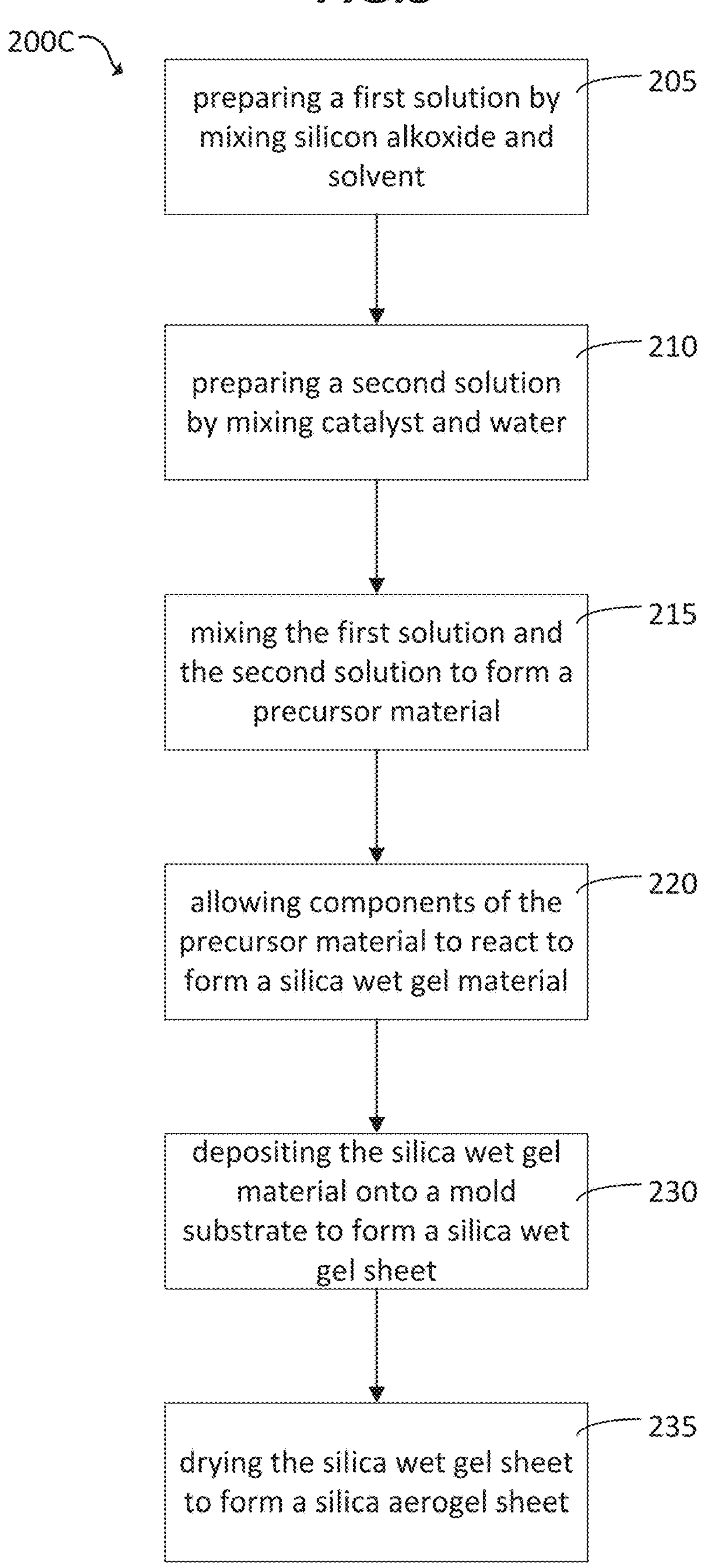
FIG.3
200C
preparing a first solution by mixing silicon alkoxide and solvent
205
preparing a second solution by mixing catalyst and water
210
mixing the first solution and the second solution to form a precursor material
215
allowing components of the precursor material to react to form a silica wet gel material
220
depositing the silica wet gel material onto a mold substrate to form a silica wet gel sheet
230
drying the silica wet gel sheet to form a silica aerogel sheet
235

SSIM: 0.938

SILICA WET GEL AND AEROGEL

RELATED APPLICATIONS

This application claims priority to U.S. Provisional Patent Application No. 63/318,165, filed Mar. 9, 2022.

FIELD OF THE INVENTION

The present invention relates to a precursor material for a silica wet gel and methods of making silica wet gel. The present invention also relates to silica wet gel and methods of making silica wet gel. The present invention also relates to silica aerogel and methods of making silica aerogel. Additionally, the present invention relates to silica aerogel sheets and methods of making silica aerogel sheets. Further, the present invention relates to an article having a glass sheet and a silica aerogel sheet and methods of making such an article. Still further, the present invention relates to an insulating glazing unit having a silica aerogel sheet between glass sheets and methods of making such an insulating glazing unit. Further yet, the present invention relates to a laminated glass assembly having a silica aerogel sheet between glass sheets and methods of making such a laminated glass assembly.

BACKGROUND OF THE INVENTION

Silica aerogels are thermally insulating materials, but traditionally they have had limited applications in windows and other glazings because they have not had high enough visible transmission and have been quite hazy in appearance. Even in applications where haze has been reduced and visible transmission increased, silica aerogels have suffered from other optical defects.

It would be desirable to provide a precursor material, silica wet gel, silica aerogel and methods of making such materials that can be used to form an enhanced silica aerogel sheet having fewer optical defects along with low haze and high visible transmission and other desirable properties. Further, it would be desirable to provide an article comprising a glass sheet and an enhanced silica aerogel sheet. It would also be desirable to provide an insulating glazing unit comprising an enhanced silica aerogel sheet. Similarly, it would be desirable to provide a laminated glass assembly comprising an enhanced silica aerogel sheet.

BRIEF DESCRIPTION OF THE DRAWINGS

FIG. 3 is a flow chart depicting a method of making a silica aerogel sheet in accordance with certain embodiments;

FIG. 4 is a schematic, broken-away, cross-sectional side view of an article having a glass sheet and a silica aerogel sheet in accordance with certain embodiments;

SUMMARY OF THE INVENTION

Figure 1:
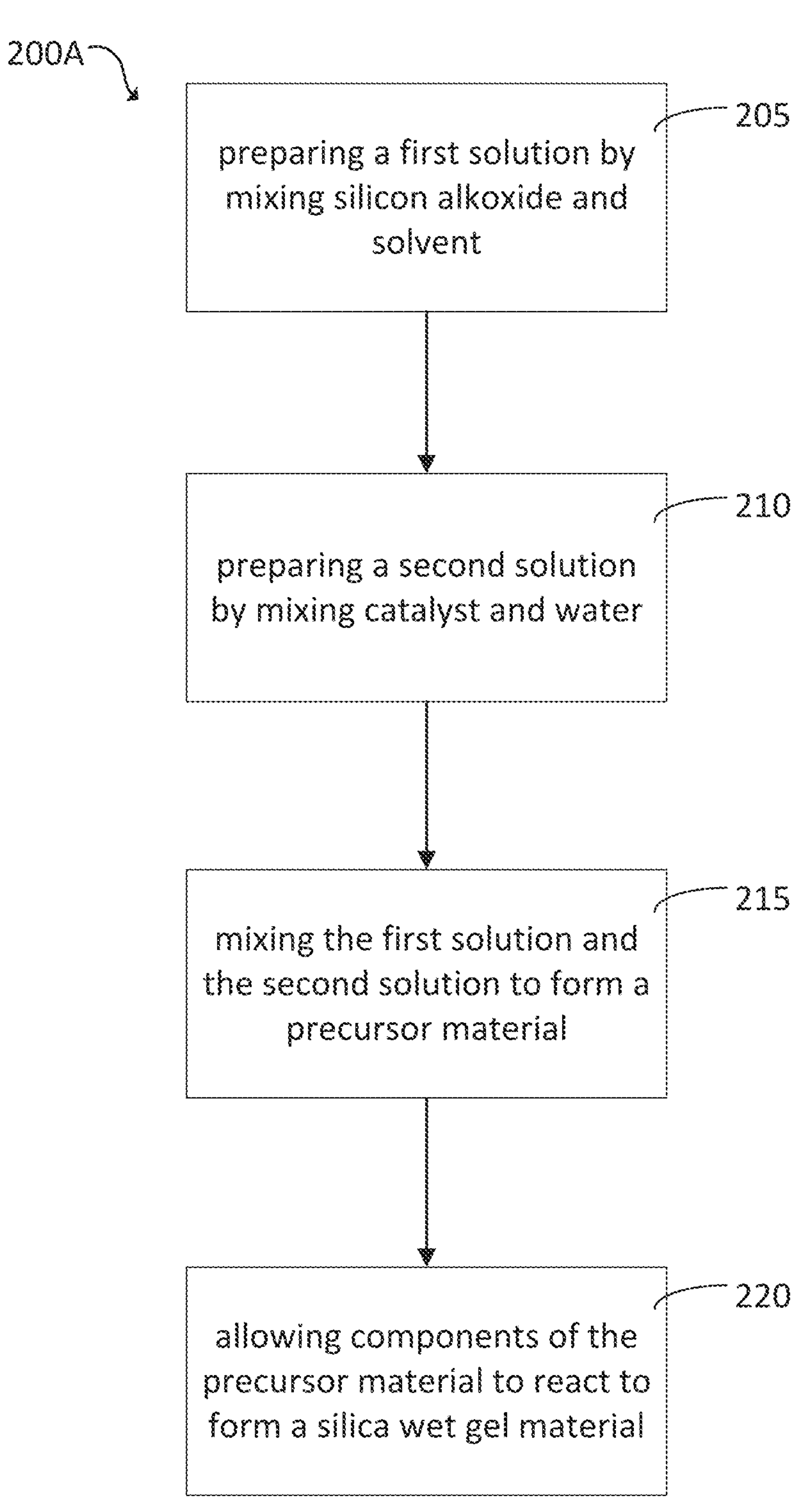
FIG. 1 is a flow chart depicting a method of making silica wet gel in accordance with certain embodiments of the present invention.

Certain embodiments provide a precursor material for silica wet gel. The precursor material comprises silicon alkoxide, solvent, base catalyst and water. In certain cases, the precursor material comprises methyl silicate 51, methanol, ammonium hydroxide and water.

In some cases, the precursor material comprises methyl silicate 51 at a weight percent of greater than or equal to 15% and less than or equal to or equal to 24%. In certain cases, the weight percent of the methyl silicate 51 is greater than or equal to 15.28% and less than or equal to 19%.

In certain cases, the precursor material comprises methanol at a weight percent of greater than or equal to 60% and less than or equal to 68%. In some cases, the weight percent of the methanol is greater than or equal to 65.16% and less than or equal to 68.52%.

Also, in certain cases, the precursor material comprises water at a weight percent of greater than or equal to 15% and less than or equal to 17%. In some cases, the weight percent of the water is greater than or equal to 15.68% and less than or equal to 16.04%.

Further, in certain cases, the precursor material comprises ammonium hydroxide at a weight percent of greater than or equal to 0.08% and less than or equal to 0.2%. In some cases, the weight percent of the ammonium hydroxide is greater than or equal to 0.15% and less than or equal to 0.17%.

In specific cases, the precursor material comprises methyl silicate 51 at a weight percent of greater than or equal to 15% and less than or equal to 24%, methanol at a weight percent of greater than or equal to 60% and less than or equal to 68%, water at a weight percent of greater than or equal to 15% and less than or equal to 17%, and ammonium hydroxide at a weight percent of greater than or equal to 0.08% and less than or equal to 0.2%. In certain specific cases, the precursor material comprises (or consists essentially of or consists of) methyl silicate 51 at a weight percent of greater than or equal to 15.28% and less than or equal to 19%, methanol at a weight percent of greater than or equal to 65.16% and less than or equal to 68.52%, water at a weight percent of greater than or equal to 15.68% and less than or equal to 16.04%, and ammonium hydroxide at a weight percent of greater than or equal to 0.15% and less than or equal to 0.17%.

Even further, in some cases, the precursor material comprises a weight percent ratio of the methyl silicate 51:water of between 0.25:1 and 2:1, such as a weight percent ratio of the methyl silicate 51:water of between 0.5:1 and 1:1. In certain cases, the precursor material is also devoid of N,N-dimethylformamide.

Other embodiments provide a method of making silica wet gel comprising (or consisting essentially of or consisting of) the steps of (a) preparing a first solution by mixing methyl silicate 51 and methanol, (b) preparing a second solution by mixing ammonium hydroxide and water, (c) mixing the first solution and the second solution together to form the precursor material, and (d) allowing components in the precursor material to react to form the silica wet gel.

In certain cases, the method of making silica wet gel comprises (or consists of or consists essentially of) (a) preparing a first solution by mixing methyl silicate 51 and methanol, wherein the first solution comprises methyl silicate 51 at a weight percent of greater than or equal to 15% and less than or equal to 30% and methanol at a weight percent of greater than or equal to 60% and less than or equal to 90%, (b) preparing a second solution by mixing ammonium hydroxide and water, wherein the second solution comprises ammonium hydroxide at a weight percent of greater than or equal to 0.5% and less than or equal to 1.0% and water at a weight percent of greater than or equal to 99% and less than 100%, (c) mixing the first solution and the second solution together to form a precursor material, and (d) allowing components in the precursor material to react to form the silica wet gel.

In other cases, the method of making silica wet gel comprises (or consists of or consists essentially of) (a) preparing a first solution by mixing methyl silicate 51 and methanol, (b) preparing a second solution by mixing ammonium hydroxide and water, (c) mixing the first solution and the second solution together to form a precursor material, such that the precursor material comprises a weight percent ratio of the methyl silicate 51:water of between 0.25:1 and 2:1, and (d) allowing components in the precursor material to react to form the silica wet gel.

In yet other cases, the method of making a silica wet gel material comprises (or consists of or consists essentially of) (a) preparing a first solution by mixing methyl silicate 51 and methanol, (b) preparing a second solution by mixing ammonium hydroxide and water, (c) mixing the first solution and the second solution together to form a precursor material, such that the precursor material comprises methyl silicate 51 at a weight percent of greater than or equal to 15% and less than or equal to 24%, methanol at a weight percent of greater than or equal to 60% and less than or equal to 68%, water at a weight percent of greater than or equal to 15% and less than or equal to 17%, and ammonium hydroxide at a weight percent of greater than or equal to 0.08% and less than or equal to 0.2%, and (d) allowing components in the precursor material to react to form the silica wet gel material.

Certain embodiments provide silica aerogel formed from a precursor material comprising methyl silicate 51 and having a visible transmission of greater than 98%, a haze of less than 2.5% (e.g., less than 1.75%), a thermal conductivity of less than 20 mW/m*K (e.g., 13 mW/m*K in air or less than 10 mW/m*K in the presence of inert gas such as argon or krypton) and/or a global SSIM of greater than 0.80. In some cases, the silica aerogel is in the form of a silica aerogel sheet. Also, the silica aerogel is preferably devoid of structural non-uniformities that create optical distortion lines visible to the naked eye.

Some embodiments provide a method of making silica aerogel comprising (or consisting essentially of or consisting of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components of the precursor material to react to form silica wet gel and (e) drying the silica wet gel to form the silica aerogel. In some cases, the method comprises depositing the silica wet gel onto a substrate to form a silica wet gel sheet and drying the silica wet gel sheet to form the silica aerogel as a silica aerogel sheet. The precursor material can be in accordance with any of the embodiments discussed elsewhere herein.

Certain embodiments provide an article comprising a glass sheet and silica aerogel sheet adhered to the glass sheet. The silica aerogel sheet is formed from a precursor material comprising methyl silicate 51 and being in accordance with any of the embodiments discussed elsewhere herein. The silica aerogel sheet has a visible transmission of greater than 98%, a haze of less than 2.5% (e.g., less than 1.75%), a thermal conductivity of less than 20 mW/m*K (e.g., 13 mW/m*K in air or less than 10 mW/m*K in the presence of inert gas such as argon or krypton) and/or a global SSIM of greater than 0.80 The silica aerogel sheet is preferably devoid of structural non-uniformities that create optical distortion lines visible to the naked eye.

Other embodiments provide a method of making an article comprising a glass substrate and a silica aerogel sheet. The method comprises (or consists essentially of or consists of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components in the precursor material to react to form silica wet gel; (e) depositing the silica wet gel onto a mold tray to form a silica wet gel sheet, (f) drying the silica wet gel sheet to form a silica aerogel sheet, (g) removing the silica aerogel sheet from the mold tray, and (h) adhering the silica aerogel sheet to a glass substrate. Alternatively, the method comprises (or consists essentially of or consists of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components in the precursor material to react to form silica wet gel; (e) depositing the silica wet gel onto a mold tray to form a silica wet gel sheet, (f) removing the silica wet gel sheet from the mold tray, (g) drying the silica wet gel sheet to form a silica aerogel sheet, and (h) adhering the silica aerogel sheet to a glass substrate. The precursor material can be in accordance with any of the embodiments discussed elsewhere herein.

Certain embodiments provide an insulating glazing unit comprising two glass sheets and a between-pane space, the between-pane space being located between the two glass sheets. The insulating glazing unit further comprises a silica aerogel sheet inside the between-pane space. The silica aerogel sheet is formed from a precursor material comprising methyl silicate 51 and is in accordance with any of the embodiments discussed elsewhere herein. The silica aerogel sheet has a visible transmission of greater than 98%, a haze of less than 1.75%, a thermal conductivity of less than 13 mW/m*K in air (or less than 10 mW/m*K in the presence of inert gas such as argon or krypton) and/or a global SSIM of greater than 0.80. In some cases, the silica aerogel sheet is adhered to an interior surface of one of the two glass sheets. Preferably, the silica aerogel sheet is devoid of structural non-uniformities that create optical distortion lines visible to the naked eye.

Other embodiments provide a method of making an insulating glazing unit. The method comprises (or consists essentially of or consists of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components in the precursor material to react to form silica wet gel; (e) depositing the silica wet gel onto a mold tray to form a silica wet gel sheet, (f) drying the silica wet gel sheet to form a silica aerogel sheet, (g) removing the silica aerogel sheet from the mold tray, and (h) assembling the silica aerogel sheet together with two glass sheets in forming the insulating glazing unit. Alternatively, the method comprises (or consists essentially of or consists of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components in the precursor material to react to form silica wet gel; (e) depositing the silica wet gel onto a mold tray to form a silica wet gel sheet, (f) removing the silica wet gel sheet from the mold tray, (g) drying the silica wet gel sheet to form a silica aerogel sheet, and (h) assembling the silica aerogel sheet together with two glass sheets in forming the insulating glazing unit. The precursor material can be in accordance with any of the embodiments discussed elsewhere herein.

Certain embodiments provide a laminated glass assembly comprising two glass sheets and a silica aerogel sheet between the glass sheets. The silica aerogel sheet is formed from a precursor material comprising methyl silicate 51 and is in accordance with any embodiment described elsewhere herein. The silica aerogel sheet has a visible transmission of greater than 98%, a haze of less than 1.75%, a thermal conductivity of less than 13 mW/m*K in air (or less than 10 mW/m*K in the presence of inert gas such as argon or krypton) and/or a global SSIM of greater than 0.80. The silica aerogel sheet is adhered to both of the glass sheets. Preferably, the silica aerogel sheet is devoid of structural non-uniformities that create optical distortion lines visible to the naked eye.

Other embodiments provide a method of making a laminated glass assembly. The method comprises (or consists essentially of or consists of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components in the precursor material to react to form silica wet gel; (e) depositing the silica wet gel onto a mold tray to form a silica wet gel sheet, (f) drying the silica wet gel sheet to form a silica aerogel sheet, (g) removing the silica aerogel sheet from the mold tray, and (h) assembling the silica aerogel sheet together with two glass sheets in forming the laminated glass assembly. Alternatively, the method comprises (or consists essentially of or consists of) the steps of (a) preparing a first solution by mixing methyl silicate 51 and methanol, (b) preparing a second solution by mixing ammonium hydroxide and water, (c) mixing the first solution and the second solution together to form a precursor material, (d) allowing components in the precursor material to react to form silica wet gel; (e) depositing the silica wet gel onto a mold tray to form a silica wet gel sheet, (f) removing the silica wet gel sheet from the mold tray, (g) drying the silica wet gel sheet to form a silica aerogel sheet, and (h) assembling the silica aerogel sheet together with two glass sheets in forming the laminated glass assembly. The precursor material can be in accordance with any of the embodiments discussed elsewhere herein.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

In the present specification, anywhere the terms "comprising" or "comprises" are used, those terms have their ordinary, open-ended meaning. In addition, the disclosure at each such location is to be understood to also disclose that it may, as an alternative, "consist essentially of" or "consist of."

Applicant has observed that silica aerogels having lower haze still may suffer from other undesirable optical defects. One common optical defect is the appearance of optical distortion lines caused by structural non-uniformities within the silica aerogel. Applicant has noted that as haze is reduced in the silica aerogel, optical distortion lines may become more visible. Applicant developed silica wet gels that can be used to form enhanced silica aerogels, such as silica aerogel sheets, having few to no optical distortion lines while also maintaining other desirable properties. Preferably, the silica aerogel sheets are devoid of structural non-uniformities that create optical distortion lines visible to the naked eye.

Certain embodiments provide a precursor material for silica wet gel. The precursor material comprises a silica precursor, such as silicon alkoxide or alkoxysilane. The precursor material serves as an intermediate product that is used to form silica wet gel. The term "silica wet gel" refers to a material that is obtained by allowing components of a precursor material including silicon alkoxide to react to form a wet gel. Further, the term "silica aerogel" refers to a material that is obtained by removing liquid from a silica wet gel and replacing the liquid with a gas or vacuum.

In some embodiments, the precursor material comprises (or consists essentially of or consists of) silicon alkoxide, solvent, water and base catalyst. The silicon alkoxide, solvent, water and base catalyst are provided within selected weight percent ranges. Applicant has identified weight percent ranges for the precursor material that can be used to form silica wet gel, which in turn can be used to form silica aerogel having desired and unexpected properties.

In certain cases, the precursor material comprises (or consists essentially of or consists of) silicon alkoxide at a weight percent greater than or equal to 15% and less than or equal to 24%, solvent at a weight percent of greater than or equal to 60% and less than or equal to 68%, water at a weight percent of greater than or equal to 15% and less than or equal to 17%, and catalyst at a weight percent of greater than or equal to 0.08% and less than or equal to 0.2%. In certain cases, the silica wet gel material comprises (or consists essentially of or consists of) silicon alkoxide precursor at a weight percent greater than or equal to 15.28% and less than or equal to 19%, solvent at a weight percent of greater than or equal to 65.16% and less than or equal to 68.52%, water at a weight percent of greater than or equal to 15.68% and less than or equal to 16.04%, and catalyst at a weight percent of greater than or equal to 0.15% and less than or equal to 0.17%.

Also, in some embodiments, the silica wet gel has a specified weight percent ratio of silicon alkoxide precursor: water. Applicant has also identified a ratio range for the silicon alkoxide precursor and water in the silica wet gel that can be used to form silica aerogel having desired and unexpected properties. In some cases, the silica wet gel has a weight percent ratio of the silicon alkoxide precursor:water of between 0.25:1 and 2:1, such as a weight percent ratio of the silicon alkoxide precursor:water of between 0.5:1 and 1:1.

In some cases, the precursor material comprises methyl silicate 51 as the silicon alkoxide. Applicant has found that methyl silicate 51 provides desirable results. Applicant has discovered that by using methyl silicate 51 as the silicon alkoxide, the resulting silica aerogel has less haze and less optical distortion than with other silicon alkoxides.

Further, in some embodiments, the precursor material has a weight percent ratio of the methyl silicate 51:water of between 0.25:1 and 2:1, such as a weight percent ratio of the methyl silicate 51:water of between 0.5:1 and 1:1. Applicant has discovered that precursor materials having methyl silicate 51:water within the listed weight percent ratios can be used to form silica wet gels and therefore silica aerogels materials having numerous desirable and unexpected properties.

Also, in some cases, the precursor material comprises methanol as the solvent. Applicant has discovered that by using methanol as the solvent, the resulting silica aerogel has less haze and less optical distortion than with other solvents.

In certain cases, the precursor material comprises ammonium hydroxide as the catalyst. Here too, Applicant has discovered that by using ammonium hydroxide as the catalyst, the resulting silica aerogel has less haze and less optical distortion than with other catalysts.

In some embodiments, the precursor material comprises (or consists essentially of or consists of) methyl silicate 51, methanol, water and ammonium hydroxide. In certain cases, the precursor material comprises (or consists essentially of or consists of) methyl silicate 51 at a weight percent of greater than or equal to 15% and less than or equal to 24%, methanol at a weight percent of greater than or equal to 60% and less than or equal to 68%, water at a weight percent of greater than or equal to 15% and less than or equal to 17%, and ammonium hydroxide at a weight percent of greater than or equal to 0.08% and less than or equal to 0.2%. Furthermore, in certain cases, the precursor material comprises (or consists essentially of or consists of) methyl silicate 51 at a weight percent of greater than or equal to 15.28% and less than or equal to 19%, methanol at a weight percent of greater than or equal to 65.16% and less than or equal to 68.52%, water at a weight percent of greater than or equal to 15.68% and less than or equal to 16.04%, and ammonium hydroxide at a weight percent of greater than or equal to 0.15% and less than or equal to 0.17%.

Other embodiments provide a method of making a silica wet gel. FIG. 1 illustrates a method 200A according to certain embodiments. The method 200A comprises a step 205 of preparing a first solution by mixing a silicon alkoxide and a solvent, a step 210 of preparing a second solution by mixing a catalyst and water, a step 215 of mixing the first solution and the second solution together to form a precursor material, and a step 220 of allowing components of the precursor material to react to form silica wet gel.

In certain cases, step 205 comprises preparing a first solution by mixing methyl silicate 51 and methanol and step 210 comprises preparing a second solution by mixing ammonium hydroxide and water. Further, step 215 comprises mixing the first solution and the second solution together to form a precursor material having components within specific weight percentages.

In some cases, the first solution comprises (or consists essentially of or consists of) methyl silicate 51 at a weight percent of greater than or equal to 15% and less than or equal to 30% and methanol at a weight percent of greater than or equal to 60% and less than or equal to 90%. Furthermore, in some cases, the second solution comprises (or consists essentially of or consists of) ammonium hydroxide at a weight percent of greater than or equal to 0.5% and less than or equal to 1.0% and water at a weight percent of greater than or equal to 99% and less than 100%.

In some cases, the precursor material has a weight percent ratio of the methyl silicate 51:water of between 0.25:1 and 2:1, such as between 0.5:1 and 1:1. Also, in some cases, the precursor material is devoid of N,N-dimethylformamide. This can optionally be the case for the precursor material in any embodiment of the present disclosure.

Figure 2:
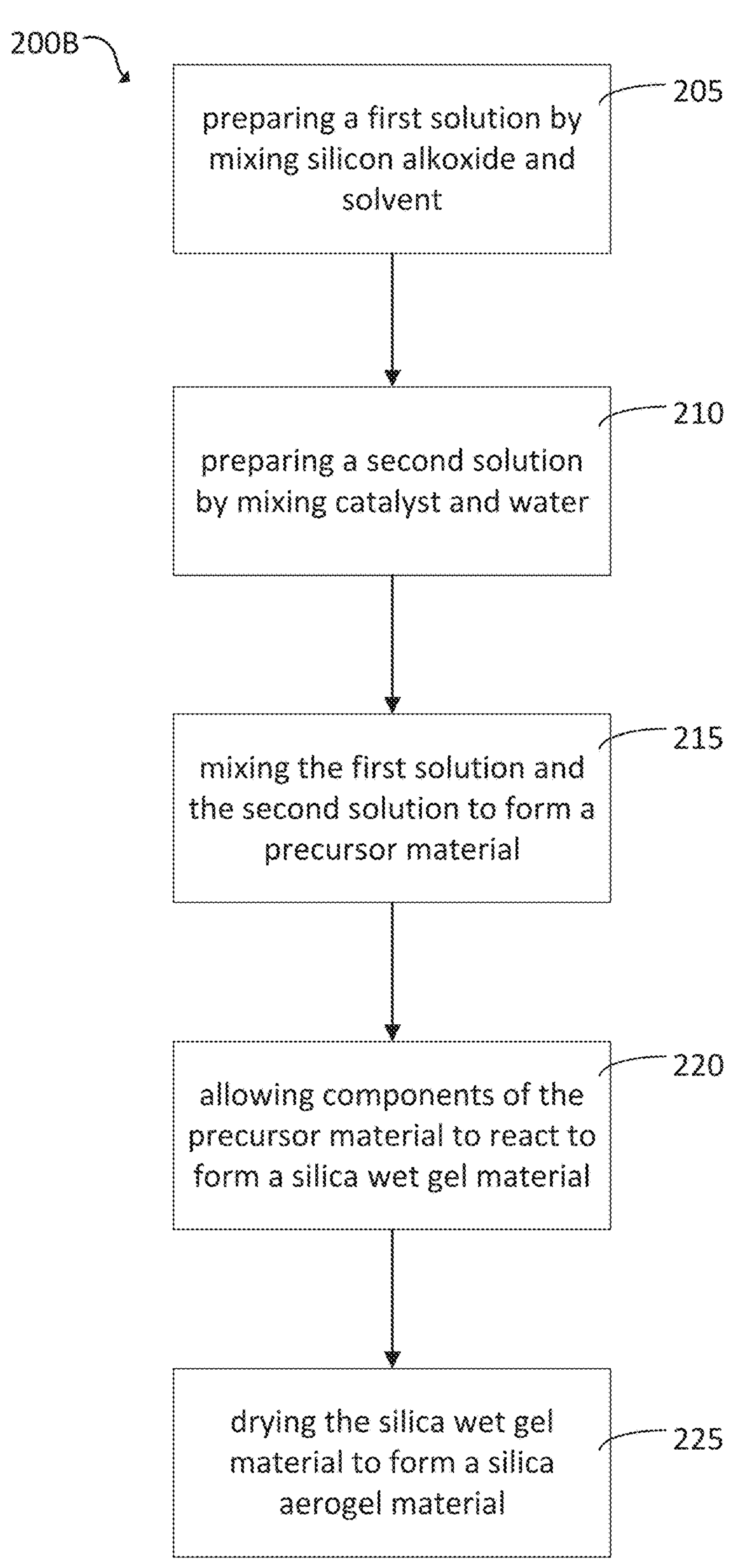
FIG. 2 is a flow chart depicting a method of making silica aerogel in accordance with certain embodiments.

Other embodiments provide a method of making silica aerogel. FIG. 2 illustrates a method 200B according to certain embodiments. The method 200B comprises steps 205 through 220 of making silica wet gel, as described elsewhere herein, and a step 225 of drying the silica wet gel to form silica aerogel.

In certain embodiments, the silica wet gel is dried using a conventional aerogel drying method. In many cases, the silica wet gel is placed in either a freeze dryer, a supercritical dryer, or an ambient dryer. In such instances, the step 225 of drying the flexible gel layer comprises either a freeze-drying process, a supercritical drying process, or an ambient drying process.

In some cases, the silica wet gel is dried using a supercritical drying method (also known as critical point drying). As is well-known to skilled artisans, supercritical drying involves a solvent exchange. Specifically, the water initially inside the silica wet gel is replaced with a suitable organic solvent (e.g., methanol, ethanol, or acetone). The silica wet gel is then placed in a pressure vessel along with liquid carbon dioxide. The pressure vessel may be filled with, and emptied of, liquid carbon dioxide multiple times, so as to remove the organic solvent and leave liquid carbon dioxide in its place. The liquid carbon dioxide is then heated past its critical temperature and pressure and removed, thereby leaving silica aerogel.

In other cases, the silica wet gel is dried using an ambient drying method. As used herein, ambient drying involves drying the flexible gel layer under ambient conditions (e.g., at a temperature in a range of from about 50 degrees to about 85 degrees Fahrenheit, and more typically in a range of from 68 degrees to 72 degrees Fahrenheit). The liquid in the silica wet gel is allowed to slowly evaporate under controlled conditions, leaving silica aerogel. The controlled conditions ensure that the evaporation is slow enough so that the silica network of the gel does not collapse during the drying. With ambient drying, the dryer is configured to establish a controlled environment in its interior. This may involve a controlled temperature, a controlled pressure, a controlled airflow, a controlled humidity, or any combination thereof.

In still other cases, the silica wet gel is dried using a freeze-drying method. The silica wet gel is frozen and then put into a vacuum chamber. The solvent is then removed to leave silica aerogel. Any suitable freeze-drying technique known in the art may be used. As non-limiting examples, the silica wet gel can be placed into a household freezer, liquid nitrogen, or in a cryogenic mixture (e.g., a dry-ice/solvent mixture, such as a dry-ice and acetone bath).

Other fabrication techniques can be used such a rapid supercritical extraction technique. Reference is made to U.S. Pat. No. 8,080,591, the salient teachings of which are incorporated herein by reference.

In some cases, the silica aerogel is provided in the form of a silica aerogel sheet. This is in contrast to aerogel in flowable granular or otherwise particulate form. The aerogel sheet is preferably self-supporting, i.e., once fully synthesized and formed, the sheet can retain sheet form without being adhered to glass or another support. This can optionally be the case for any embodiment of the present disclosure involving a silica aerogel sheet.

Certain embodiments provide a method of making a silica aerogel sheet. FIG. 3 illustrates a method 200C comprising steps 205 through 220 of making silica wet gel as described elsewhere herein and a step 230 of depositing the silica wet gel onto a mold tray to form a silica wet gel sheet and a step 235 of drying the silica wet gel sheet to form a silica aerogel sheet. The step 235 of drying the silica wet gel sheet can take place while the sheet is on the mold tray or after it is removed from the mold tray.

The silica aerogel sheet is an enhanced sheet having desirable and unexpected properties. First, the silica aerogel sheet desirably has low haze. For any embodiment involving a silica aerogel sheet, the haze can optionally be less than 2.5%, such as less than 2%. In some cases, the silica aerogel sheet has a haze of less than or equal to 1.75%. This preferably is the case for any embodiment involving a silica aerogel sheet. Haze can be measured in well-known fashion, e.g., using a BYK HazeGard plus instrument. Reference is made to ASTM D 1003-00: Standard Test method for Haze and Luminous Transmittance of Transparent Plastics, the contents of which are incorporated herein by reference.

Further, the silica aerogel sheet desirably has few to no optical distortion lines ("ODL"). After observing the appearance of ODL in sheets from various silica aerogels, Applicant developed a method for assessing severity of ODL that involves calculating a global structural similarity index measure ("SSIM") for a silica aerogel sheet sample.

Figure 11:
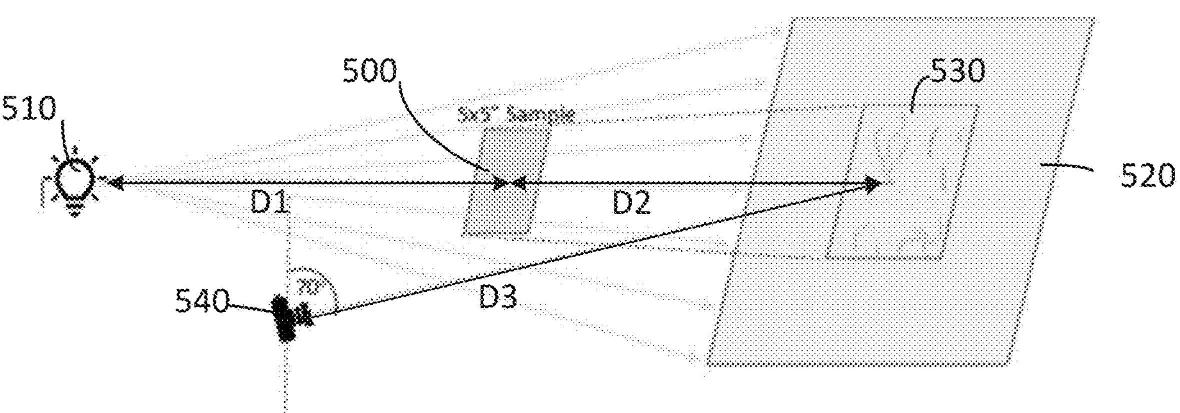
FIG. 11 is a schematic illustration of a setup for measuring the shadow projection of a silica aerogel sheet in accordance with certain embodiments.

The ODL is assessed in the following manner. First, a silica aerogel sheet sample 500 is provided. The sheet sample 500 has a size of 5×5 inches. The silica aerogel sheet sample 500 is placed between a light source 510 and a projection screen 520. Reference is made to FIG. 11. The projection screen 520 is a flat matte white paper having a size of 15 inches by 15 inches. The silica aerogel sheet sample 500 is placed at a distance D1 of 12 inches from the light source 510 and at a distance D2 of 8 inches from the projection screen 520. The sheet sample 500 and the projection screen 520 are parallel to each other, with the light source centered on a sightline axis passing through a center of the sheet sample 500.

The light source 510 is a full spectrum LED with eight individual white light bulbs replicating a daylight spectrum. One suitable light source 510 is a fiber-coupled cold white LED (model number MCWHF2$^k$) obtained from Thorlabs Inc. (a company having its headquarters in Newton, New Jersey, U.S.A.). When light from the light source 510 passes through the sheet sample 500, a projection 530 of the sample is provided on the projection screen 520. Any optical distortion shows up on the projection 530 as a shadow (i.e., a shadow projection).

A DSLR camera 540 is placed at a distance D3 of 14 inches from a center point of the projection screen 520, aimed at the distortion image 530, and at an angle of 70 degrees from a line perpendicular to the sightline axis. One suitable DSLR camera 540 is a Canon Powershot SX540HS, 20.3 MegaPixel 1/2.3 in CMOS sensor with a 4.3-214 mm zoom lens obtained from Canon USA (a company having its headquarters in Melville, New York, U.S.A.).

The optical zoom on the camera 540 is adjusted to capture a window of an image of the shadow projection 530 at the highest resolution possible. This captured image is the distortion image. Note that because the camera 540 is at an angle to the projection screen 520, the shadow projection 530 is slightly trapezoidal (similar to the keystone effect in projectors). The distortion image therefore captures the largest rectangular window that can be cropped from the shadow projection 530.

Likewise, the optical zoom on the camera 540 is adjusted to capture a window of an image of the projection screen 520 alone (i.e., without the shadow projection 530) at the highest resolution possible. This captured image is the reference image. The reference image captures the same size window that is captured for the distortion image.

Next, a global SSIM is calculated by comparing the distortion image to a reference image. The global SSIM is a measure of the total differences between the distortion image and the reference image. The present invention uses the method described in Z. Wang, A. C. Bovik, H. R. Sheikh and E. P. Simoncelli, "Image quality assessment: From error visibility to structural similarity," IEEE Transactions on Image Processing, vol. 13, no. 4, pp. 600-612, April 2004, the entire contents of which are incorporated herein by reference. The global SSIM is calculated using the following formula:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

with:

$\mu_x$ the average of $x$;

$\mu_y$ the average of $y$;

$\sigma_x^2$ the variance of $x$;

$\sigma_y^2$ the variance of $y$;

$\sigma_{xy}$ the covariance of $x$ and $y$;

$c_1 = (k_1 L)^2 . c_2 = (k_2 L)^2$ two variables to stabalize the division with weak denominator;

$L$ the dynamic range of the pixel-values (typically this is $2^{\#bits\ per\ pixel} \ldots 1$);

$k_1 = 0.01$ and $k_2 = 0.03$ by default

Further, the global SSIM can be calculated using a software program or index calculating code. For example, the global SSIM can be calculated using a Matlab implementation of the SSIM index disclosed at https://ece.uwaterloo.ca/~z70wang/research/ssim/#usage, the entire contents of which are incorporated herein by reference.

The calculated global SSIM ranges from 0.00 to 1.00, with 0.00 showing the lowest structural similarity and 1.00 showing the highest structural similarity. Applicant has discovered that silica aerogel sheets produced from recipes described herein provide distortion images with a global SSIM of greater than 0.80. Applicant has discovered that sheets having a global SSIM of greater than 0.80 advantageously provide low ODL. Moreover, Applicant has discovered that these particular recipes surprisingly do so without being substantially sensitive to the drying process or other downstream processes used to form the silica aerogel sheet.

Thus, in some cases, the silica aerogel sheet has a calculated global SSIM of greater than 0.80. This can optionally be the case for any embodiment of the present disclosure involving a silica aerogel sheet. In particular cases, the silica aerogel sheet can have a calculated global SSIM of greater than 0.82, greater than 0.85, greater than 0.87, greater than 0.90, greater than 0.91, greater than 0.92 or greater than 0.93. In preferred cases, the silica aerogel sheet is devoid of structural non-uniformities that create optical distortion lines visible to the naked eye. In addition, the distortion image produced for such a silica aerogel sheet preferably is also devoid of optical distortion lines visible to the naked eye. This is preferably the case for any embodiment involving a silica aerogel sheet, optionally in combination with a visible transmission in the range noted in the next paragraph.

The silica aerogel sheet desirably has high visible transmission. In some cases, the silica aerogel sheet has a visible transmission of greater than 98%. The term "visible transmission" is well known in the art and is used herein in accordance with its well-known meaning to refer to the percentage of all incident visible radiation that is transmitted through an object (e.g., through the aerogel sheet 300). Visible radiation constitutes the wavelength range of between about 380 nm and about 780 nm. Visible transmission, as well as visible reflection, can be determined in accordance with NFRC 300-2017, Standard Test Method for Determining the Solar and Infrared Optical Properties of Glazing Materials and Fading Resistance of Systems. The well-known and commercially available LBNL WINDOW 7.4 computer program can be used in calculating these and other reported optical properties.

The silica aerogel sheet can also have desirable transmitted color characterized by "a" and "b" color coordinates that are each between −2 and 2. This can optionally be the case for any embodiment of the present disclosure involving a silica aerogel sheet, preferably in combination with visible transmission and haze levels in the ranges noted above. The present discussion of color properties is reported using the well-known color coordinates of "a" and "b." In more detail, the color coordinates are indicated herein using the subscript h (i.e., $a_h$ and $b_h$) to represent the conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, 06/08 (2008), the relevant teachings of which are incorporated herein by reference.

In addition, the silica aerogel sheet can have a low bulk density. In certain embodiments, the silica aerogel sheet has a bulk density of less than 150 mg/cc. In some cases, the silica aerogel sheet has a bulk density of less than 140 mg/cc, such as less than 130 mg/cc, or even less than 125 mg/cc. In certain embodiments, the silica aerogel sheet has a bulk density of higher than 70 mg/cc. In some cases, the silica aerogel sheet has a bulk density of higher than 80 mg/cc, such as higher than 85 mg/cc, or even higher than 95 mg/cc. In preferred embodiments, the silica aerogel sheet has a bulk density of between 100 mg/cc and 150 mg/cc, such as 120 mg/cc. The density of the silica aerogel sheet can optionally be in this range for any embodiment of the present disclosure, preferably in combination with visible transmission and haze levels in the ranges noted above (e.g., $T_{vis}$ greater than 98% together with haze of less than 2.5%, less than 2%, or less than 1.75%). Bulk density is calculated by weighing the aerogel sheet and then calculating the volume using the weight along with the dimensions of the aerogel sheet.

The silica aerogel sheet can also have low thermal conductivity. For example, the silica aerogel sheet can have a thermal conductivity of less 20 mW/m*K, such as less than 13 mW/m*K in air (or less than 10 mW/m*K in inert gas such as argon). The thermal conductivity of the silica aerogel sheet can optionally be in one or both of these ranges for any embodiment of the present disclosure. Thermal conductivity can be determined using a conventional heat flow meter, such as the well-known TA Instruments Fox 200 heat flow meter, which is commercially available from Waters Corporation (New Castle, Delaware, U.S.A.).

Further, the silica aerogel sheet can have a flexural modulus of less than 750 kPa and perhaps less than or equal to 720 kPa, 700 kPa or 680 kPa. The flexural modulus of a material is a mechanical property that measures a material's stiffness or resistance to bending and is defined as the ratio of stress to strain in flexural deformation. It is determined from the slope of a stress-strain curve produced by a flexural test, such as ASTM D790: Standard Test Methods for Flexural Properties of Unreinforced and Reinforced Plastics and Electrical Insulating Material, the contents of which are incorporated herein by reference. The higher the flexural modulus of a material, the harder it is to bend. Conversely, the lower the flexural modulus, the easier it is for the material to bend under an applied force.

Even further, the silica aerogel sheet can have an average pore size of less than 30 nm, such as less than or equal to 26 nm. This can optionally be the case for any embodiment of the present disclosure that involves the silica aerogel sheet. The average pore size can be determined using a Quantachrome "autosorb-iQ" gas absorption analyzer, which is commercially available from Anton Paar (Graz, Austria) along with calculating average pore size using density functional theory (DFT) calculations.

Further, the silica aerogel sheet can also have a specific surface area of at least 800 $m^2/g$, such as greater than or equal to 850 $m^2/g$ or perhaps greater than or equal to 900 $m^2/g$. This can optionally be the case for any embodiment of the present disclosure that involves the silica aerogel sheet, preferably in combination with an average pore diameter in one or both ranges noted in the paragraph above and/or in combination with a density of between 100 mg/cc and 150 mg/cc, optionally in further combination with visible transmission and haze levels in the ranges noted above (e.g., $T_{vis}$ greater than 98% together with haze of less than 2.5%, less than 2%, or less than 1.75%). The specific surface area can also be determined using a Quantachrome "autosorb-iQ" gas absorption analyzer, which is commercially available from Anton Paar (Graz, Austria) along with calculating specific surface area using density functional theory (DFT) calculations.

Three exemplary silica aerogel sheets were prepared as outlined below. Additionally, five comparative exemplary silica aerogel sheets were attempted. Properties for silica aerogel sheets obtained were also measured using methods described herein and tabulated in Tables 1 and 2.

Example #1

Example #1 was prepared according to the following steps:

A. Preparing a first solution by mixing 5.5 mL MS-51 and 37.0 mL methanol. The first solution included MS-51 at a weight percent of 18.2% and methanol at a weight percent of 81.8%.

B. Preparing a second solution by mixing 6.9 mL water and 0.07 mL ammonium hydroxide. The second solution included water at a weight percent of 99.0% and ammonium hydroxide at a weight percent of 1.0%.

C. Mixing the first solution and second solution together to form a mixed solution. The mixed solution included MS-51 at a weight percent of 15.28%, methanol at a weight percent of 68.52%, water at a weight percent of 16.04% and ammonium hydroxide at a weight percent of 0.16%. The mixed solution had a MS-51:water weight ratio of 0.95:1.

D. Depositing the mixed solution in a mold having interior dimensions of 5 inch by 5 inch by 3.5 mm. Sealing the mold to provide an airtight environment.

E. Allowing components in the mixed solution to react to form silica wet gel sheet having dimensions of 5 inch by 5 inch by 3.5 mm.

F. Aging the silica wet gel sheet in the mold at room temperature for a time period of at least 240 hours.

G. Removing the silica wet gel sheet from the mold.

H. Placing the silica wet gel sheet in a first methanol bath and allowing solvent exchange to take place for 8 hours.

I. Placing the silica wet gel sheet in a second methanol bath and allowing solvent exchange to take place for 8 more hours.

J. Placing the silica wet gel sheet in a dryer and performing critical point drying with a complete $CO_2$ exchange to obtain a silica aerogel sheet.

Figure 12:
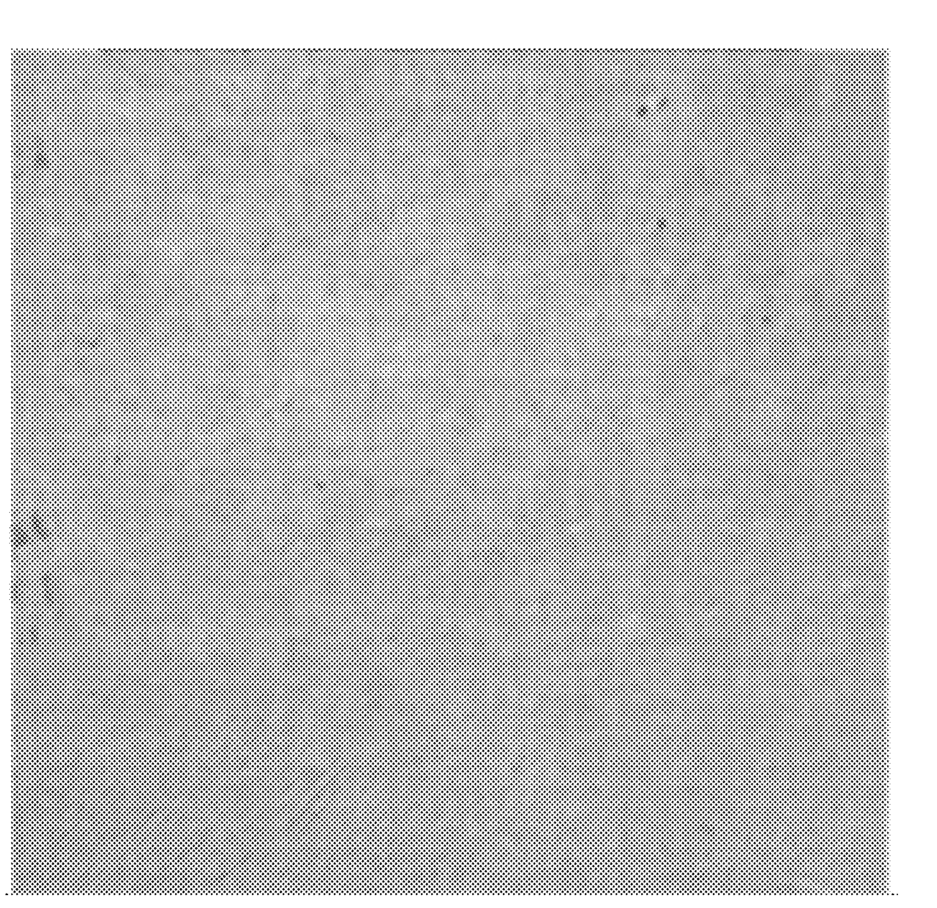
FIG. 12 includes a distortion image and corresponding SSIM obtained from a silica aerogel sheet sample.

Properties for the resulting silica aerogel sheet are shown in Tables 1 and 2. Also, FIG. 12 includes a distortion image and corresponding SSIM obtained from Example 1.

Example #2

Example #2 was prepared according to the following steps:

A. Preparing a first solution by mixing 6.2 mL MS-51 and 36.5 mL methanol. The first solution included MS-51 at a weight percent of 20.3% and methanol at a weight percent of 79.7%.

B. Preparing a second solution by mixing 6.9 mL water and 0.07 mL ammonium hydroxide. The second solution included water at a weight percent of 99.0% and ammonium hydroxide at a weight percent of 1.0%.

C. Mixing the first solution and second solution together to form a mixed solution. The mixed solution included MS-51 at a weight percent of 17.15%, methanol at a weight percent of 66.91%, water at a weight percent of 15.78% and ammonium hydroxide at a weight percent of 0.16%. The mixed solution had a MS-51:water weight ratio of 1:1.

Steps D through J were repeated as performed in Example #1. Properties for the resulting silica aerogel sheet are shown in Table 2.

Example #3

Example #3 was prepared according to the following steps:

A. Preparing a first solution by mixing 7.0 mL MS-51 and 36.0 mL methanol. The first solution included MS-51 at a weight percent of 22.6% and methanol at a weight percent of 77.4%.

B. Preparing a second solution by mixing 6.9 mL water and 0.07 mL ammonium hydroxide. The second solution included water at a weight percent of 99.0% and ammonium hydroxide at a weight percent of 1.0%.

C. Mixing the first solution and second solution together to form a mixed solution. The mixed solution included MS-51 at a weight percent of 19.00%, methanol at a weight percent of 65.16%, water at a weight percent of 15.68% and ammonium hydroxide at a weight percent of 0.16%. The mixed solution had a MS-51:water weight ratio of 1.2:1.

Steps D through J were repeated as performed in Example #1. Properties for the resulting silica aerogel sheet are shown in Table 2.

Comparative Example #1

Comparative Example #1 was prepared according to the following steps:

A. Preparing a first solution by mixing 6.4 mL TMOS and 37.0 mL methanol. The first solution included TMOS at a weight percent of 18.3% and methanol at a weight percent of 81.8%.

B. Preparing a second solution by mixing 6.9 mL water and 0.07 mL ammonium hydroxide. The second solution included water at a weight percent of 99% and ammonium hydroxide at a weight percent of 1%.

C. Mixing the first solution and second solution together to form a mixed solution. The mixed solution included TMOS at a weight percent of 15.28%, methanol at a weight percent of 68.52%, water at a weight percent of 16.04% and ammonium hydroxide at a weight percent of 0.16%.

Steps D and E were repeated as performed in Example #1. The mixed solution in Comparative Example #1 did not form a silica wet gel. As such, a silica aerogel sheet was not obtained.

Comparative Example #2

Comparative Example #2 was prepared according to the following steps:

A. Preparing a first solution by mixing 6.9 mL MTMS and 37.0 mL methanol. The first solution included MTMS at a weight percent of 18.3% and methanol at a weight percent of 81.8%.

B. Preparing a second solution by mixing 6.9 mL water and 0.07 mL ammonium hydroxide. The second solution included water at a weight percent of 99% and ammonium hydroxide at a weight percent of 1%.

C. Mixing the first solution and second solution together to form a mixed solution. The mixed solution included MTMS at a weight percent of 15.28%, methanol at a weight percent of 68.52%, water at a weight percent of 16.04% and ammonium hydroxide at a weight percent of 0.16%.

Steps D and E were repeated as performed in Example #1. The mixed solution in Comparative Example #2 also did not form a silica wet gel, and thus a silica aerogel sheet was not obtained.

Comparative Example #3

Comparative Example #3 was prepared according to the following steps:

A. Preparing a first solution by mixing 7.0 mL TEOS and 37.0 mL methanol. The first solution included TEOS at a weight percent of 18.3% and methanol at a weight percent of 81.8%.

B. Preparing a second solution by mixing 6.9 mL water and 0.07 mL ammonium hydroxide. The second solution included water at a weight percent of 99% and ammonium hydroxide at a weight percent of 1%.

C. Mixing the first solution and second solution together to form a mixed solution. The mixed solution included TEOS at a weight percent of 15.28%, methanol at a weight percent of 68.52%, water at a weight percent of 16.04% and ammonium hydroxide at a weight percent of 0.16%.

Steps D and E were repeated as performed in Example #1. The mixed solution in Comparative Example #3 also did not form a silica wet gel, and thus a silica aerogel sheet was not obtained.

Comparative Example #4

Comparative Example #4 was prepared according to the following steps:

A. Preparing a first solution by mixing 9.9 mL MS-51 and 37.3 mL methanol. The first solution included MS-51 at a weight percent of 28.5% and methanol at a weight percent of 71.5%.

B. Preparing a second solution by mixing 3.3 mL water and 0.07 mL ammonium hydroxide. The second solution included water at a weight percent of 97.9% and ammonium hydroxide at a weight percent of 2.1%.

C. Mixing the first solution and second solution together to form a mixed solution. The mixed solution included MS-51 at a weight percent of 26%, methanol at a weight percent of 66.70%, water at a weight percent of 7.2% and ammonium hydroxide at a weight percent of 0.16%. The mixed solution had a MS-51:water weight ratio of 3.6:1.

Steps D through J were repeated as performed in Example #1. Properties for the resulting silica aerogel sheet are shown in Table 2.

Comparative Example #5

Comparative Example #5 was prepared according to the following steps:

A. Preparing a first solution by mixing 2.3 mL MS-51 and 38.0 mL methanol. The first solution included MS-51 at a weight percent of 8.2% and methanol at a weight percent of 91.8%.

B. Preparing a second solution by mixing 10.9 mL water and 0.07 mL ammonium hydroxide. The second solution included water at a weight percent of 99.4% and ammonium hydroxide at a weight percent of 0.6%.

C. Mixing the first solution and second solution together to form a mixed solution. The mixed solution included MS-51 at a weight percent of 6.1%, methanol at a weight percent of 69.1%, water at a weight percent of 25% and ammonium hydroxide at a weight percent of 0.16%. The mixed solution also included a MS-51: water weight ratio of 0.2:1.

Steps D through J were repeated as performed in Example #1. The mixed solution in Comparative Example #5 also did not form a silica wet gel, and thus a silica aerogel sheet was not obtained.

TABLE 1

| | Example 1 (MS-51) | Comparative Example #1 (TMOS) | Comparative Example #2 (MTMS) | Comparative Example #3 (TEOS) |
|---|---|---|---|---|
| Alkoxysilane | 15.28% | 15.28% | 15.28% | 15.28% |
| Methanol | 68.52% | 68.52% | 68.52% | 68.52% |
| Water | 16.04% | 16.04% | 16.04% | 16.04% |
| $NH_4OH$ | 0.16% | 0.16% | 0.16% | 0.16% |
| SSIM | 0.92-0.95 | N/A | N/A | N/A |
| Haze | 0.9-1.2 | N/A | N/A | N/A |
| Transmission | 98-99% | N/A | N/A | N/A |
| Density | 100 mg/cc | N/A | N/A | N/A |
| Thermal Conductivity | 11-13 mW/m · K | N/A | N/A | N/A |
| Flexural Modulus | 700 kPa | N/A | N/A | N/A |
| Surface Area | 900-1100 $m^2/g$ | N/A | N/A | N/A |
| Average Pore Diameter | 16-26 nm | N/A | N/A | N/A |

As shown in Table 1, optimal results were obtained with the recipe of Example 1 when using a precursor material having methyl silicate 51 as the silicon alkoxide. When TMOS, MTMS and TEOS were used, silica wet gels were not obtained.

TABLE 2

| | Example 1 (0.95:1 ratio) | Example 2 (1:1 ratio) | Example 3 (1.2:1 ratio) | Comparative Example #4 (3.6:1 ratio) | Comparative Example #5 (0.24:1 ratio) |
|---|---|---|---|---|---|
| MS-51 | 15.28% | 17.15% | 19.00% | 26% | 6.1% |
| Methanol | 68.52% | 66.91% | 65.16% | 66.7% | 69.1% |
| Water | 16.04% | 15.78% | 15.68% | 7.2% | 25% |
| $NH_4OH$ | 0.16% | 0.16% | 0.16% | 0.16% | 0.16% |
| SSIM | 0.92-0.95 | 0.88-0.91 | 0.80-0.85 | N/A | N/A |
| Haze | 0.9-1.2 | 0.9-1.3 | 1.1-1.5 | 3.0-3.5% | N/A |
| Transmission | 98-99% | 98-99% | 98-99% | 80-95% | N/A |
| Density | 100 mg/cc | 110 mg/cc | 120 mg/cc | 135 mg/cc | N/A |
| Thermal Conductivity | 11-13 mW/m · K | 11-13 mW/m · K | 11-13 mW/m · K | 15-16 mW/m · K | N/A |
| Flexural Modulus | 700 kPa | 680 kPa | 720 kPa | 850 kPa | N/A |

TABLE 2-continued

| | Example 1 (0.95:1 ratio) | Example 2 (1:1 ratio) | Example 3 (1.2:1 ratio) | Comparative Example #4 (3.6:1 ratio) | Comparative Example #5 (0.24:1 ratio) |
|---|---|---|---|---|---|
| Surface Area | 900-1100 $m^2/g$ | 900-1050 $m^2/g$ | 850-1000 $m^2/g$ | 800-950 $m^2/g$ | N/A |

As shown in Table 2, optimal results are obtained with a precursor material having a weight percent ratio of the methyl silicate 51:water in the range of between 0.25:1 and 2:1. Examples 1-3 show that precursor materials having a ratio within this range yield a silica aerogel having a visible transmission of greater than or equal to 98% and a haze of less than or equal to 1.5%. Comparative Example 4 shows that a precursor material having a ratio above this range had a much lower visible transmission and higher haze. Comparative Example 5 shows that precursor material having a ratio below this range did not even form a wet gel.

Thus, one group of embodiments involves a precursor material having a weight percent ratio of the methyl silicate 51:water in the range of between 0.25:1 and 2:1, and where the resulting silica aerogel sheet having a visible transmission of greater than or equal to 98% and a haze of less than or equal to 1.5%. This can optionally be in combination with the resulting silica aerogel sheet having a density in a range of from about 100 mg/cc to about 100 mg/cc.

Figure 13:
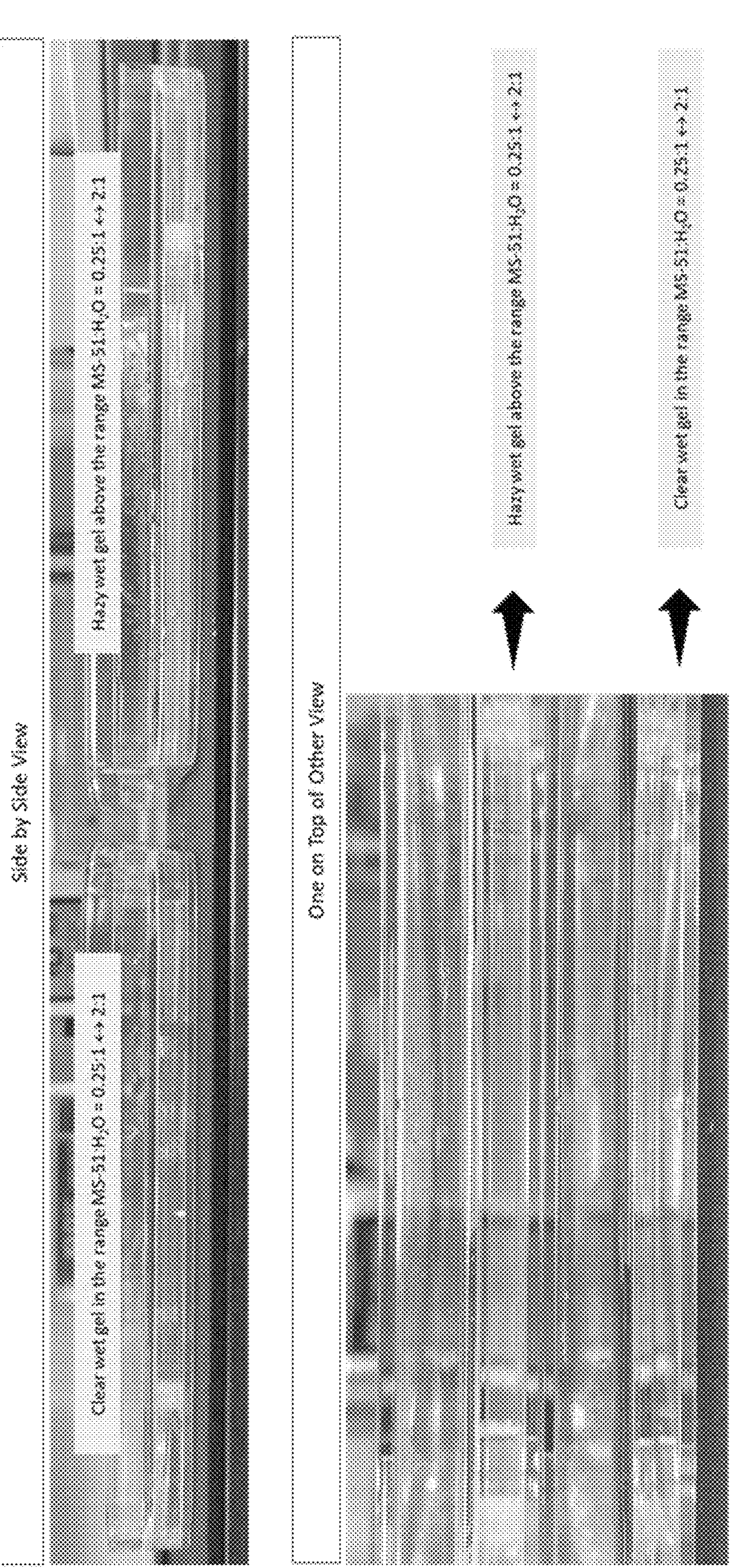
FIG. 13 includes image comparisons for silica wet gels obtained from precursor materials having comparative methyl silicate 51:water weight percent ratios.

FIG. 13 also illustrates the visible difference in silica wet gel formed from precursor materials having a weight percent ratio of the methyl silicate 51:water in the range of between 0.25:1 and 2:1, above the range. As shown, silica wet gel formed from precursor material within the range was much clearer than silica wet gel formed from a precursor material above the range.

Figure 4:
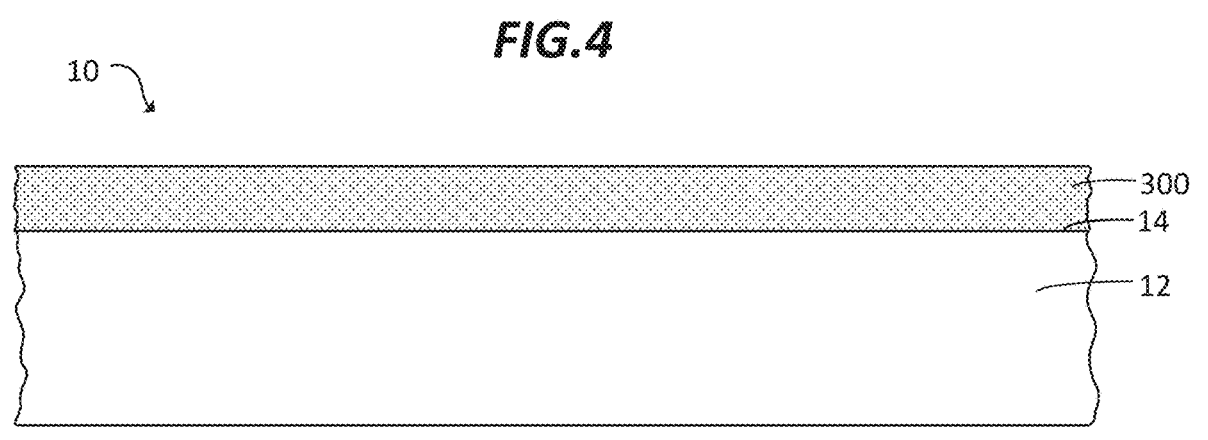

Some embodiments provide an article 10. FIG. 4 illustrates an article 10 comprising a glass sheet 12 and a silica aerogel sheet 300. The silica aerogel sheet 300 is adhered to or otherwise carried or mounted alongside the glass sheet 12. The silica aerogel sheet 300 can have any of the features and properties discussed elsewhere herein.

The silica aerogel sheet 300 preferably is adhered to a surface 14 of the glass sheet 12. By saying the aerogel sheet 300 is "adhered to" a surface of a glass sheet, this does not require a separate adhesive, though an adhesive can optionally be used. It also does not require the aerogel to contact the glass; there may be a coating or layer therebetween. Thus, although "adhered to" may involve direct contact, the broader meaning as used herein is "carried alongside." This can optionally mean the aerogel is supported by the glass surface, and in some preferred embodiments the aerogel does contact the glass surface. In some embodiments, there is at most one layer (e.g., an optical adhesive layer) between the aerogel sheet 300 and the glass sheet 12.

A variety of known glass types can be used for the glass sheet 12, including soda-lime glass, borosilicate glass or aluminosilicate glass. In some cases, it may be desirable to use "white glass," a low iron glass, etc. For some applications, it may be desirable to use tinted glass for the glass sheet 12. Moreover, there may be applications where the glass sheet 12 is formed of extremely thin, flexible glass, such as glass sold under the trademark Willow glass by Corning Inc. (Corning, New York, U.S.A.). If desired, the glass sheet 12 may be formed of a chemically strengthened glass, such as glass sold under the trademark Gorilla glass by Corning Inc. In certain embodiments, the glass sheet is part of a window, door, skylight, or other glazing. In alternative embodiments, the glass sheet 12 is replaced with a sheet formed of a polymer, such as polycarbonate, acrylic, or PVC. Various other polymer materials (e.g., transparent polymers) may be used in such alternative embodiments.

Glass sheets of various sizes can be used. Commonly, large-area glass sheets are used. For example, the glass sheet 12 can have a major dimension (e.g., a length or width) of at least about 0.1 meter, preferably at least about 0.5 meter, more preferably at least about 1 meter, perhaps more preferably at least about 1.5 meters (e.g., between about 2 meters and about 4 meters), and in some cases at least about 3 meters. In some embodiments, the glass sheet 12 is a jumbo glass sheet having a length and/or width that is between about 3 meters and about 10 meters, e.g., a glass sheet 12 having a width of about 3.5 meters and a length of about 6.5 meters.

Glass sheets of various thicknesses can be used. In some embodiments, the glass sheet 12 can have a thickness of about 1-8 mm. In some cases, the glass sheet 12 has a thickness of between about 2.3 mm and about 4.8 mm, and perhaps more preferably between about 2.5 mm and about 4.8 mm. In one particular embodiment, the glass sheet 12 has a thickness of about 3 mm.

Figure 5:
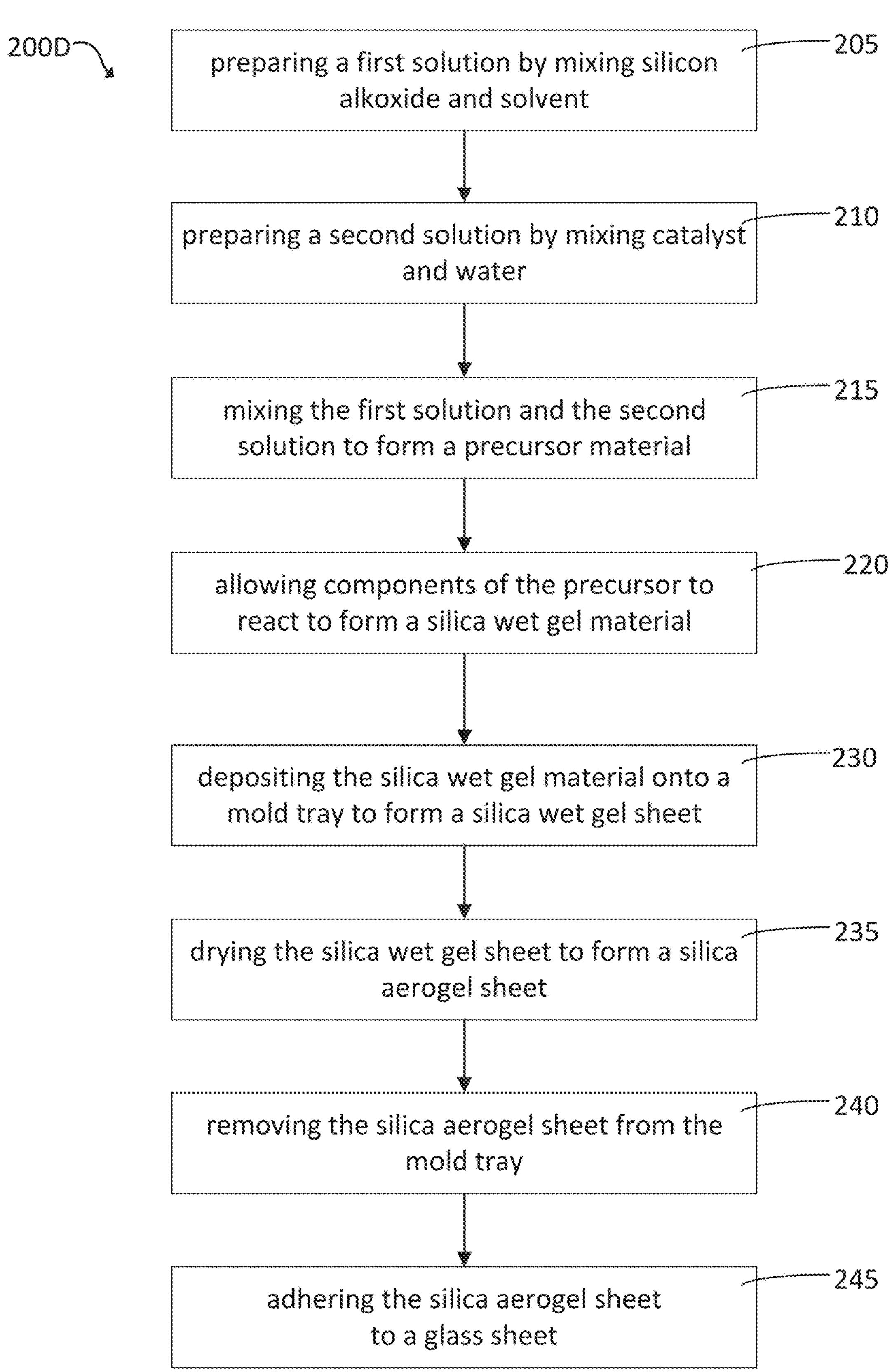
FIG. 5 is a flow chart depicting a method of making an article having a glass sheet and a silica aerogel sheet in accordance with certain embodiments.
Figure 6:
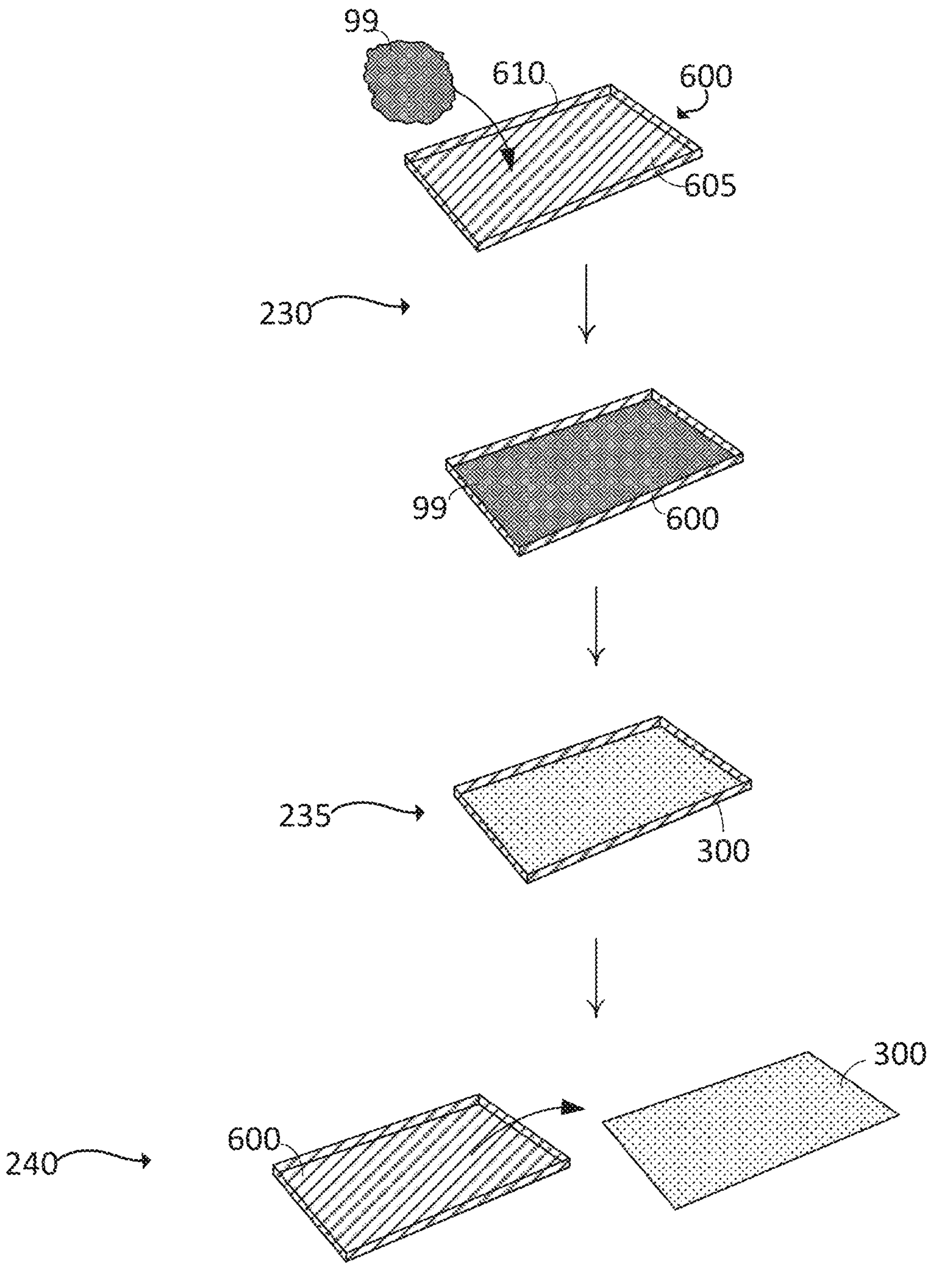
FIG. 6 illustrates perspective views of a mold tray being used in a method of making a silica aerogel sheet according to certain embodiments.

Other embodiments provide a method of making an article. FIGS. 5-6 illustrate a method 200D wherein the silica wet gel is first deposited onto and then dried in a mold tray. As shown in FIG. 5, the method 200D comprises steps 205 through 235 of forming a silica aerogel sheet as described elsewhere herein, a step 240 of removing the silica aerogel sheet from the mold tray, and a step 245 of adhering the silica aerogel sheet to a glass sheet to form the article.

FIG. 6 illustrates the method 200D of forming a silica aerogel sheet using a mold tray 600. The mold tray 600 has a base 605 and a plurality of sidewalls 610. At step 230, silica wet gel 99 is poured into the mold tray 600. At step 235, the silica wet gel 99 is dried using a conventional drying method described herein to form a silica aerogel sheet 300 having a size and dimension defined by the mold tray 600. At step 240, the dried silica aerogel sheet 300 is removed from the mold tray 600. In other embodiments not illustrated, the silica wet gel 99 is removed from the mold tray 600 before using a conventional drying method.

In some embodiments, the step 245 comprises placing the silica aerogel sheet in contact with the glass sheet, and the silica aerogel sheet adheres to the glass sheet through van der Waals forces. In other embodiments, the step 245 comprises adhering the silica aerogel sheet to a glass sheet by an optical adhesive, optionally such that portions of the silica aerogel sheet are devoid of the optical adhesive. In embodiments of this nature, the optical adhesive can optionally be located only at a perimeter of the silica aerogel sheet.

Figure 7:
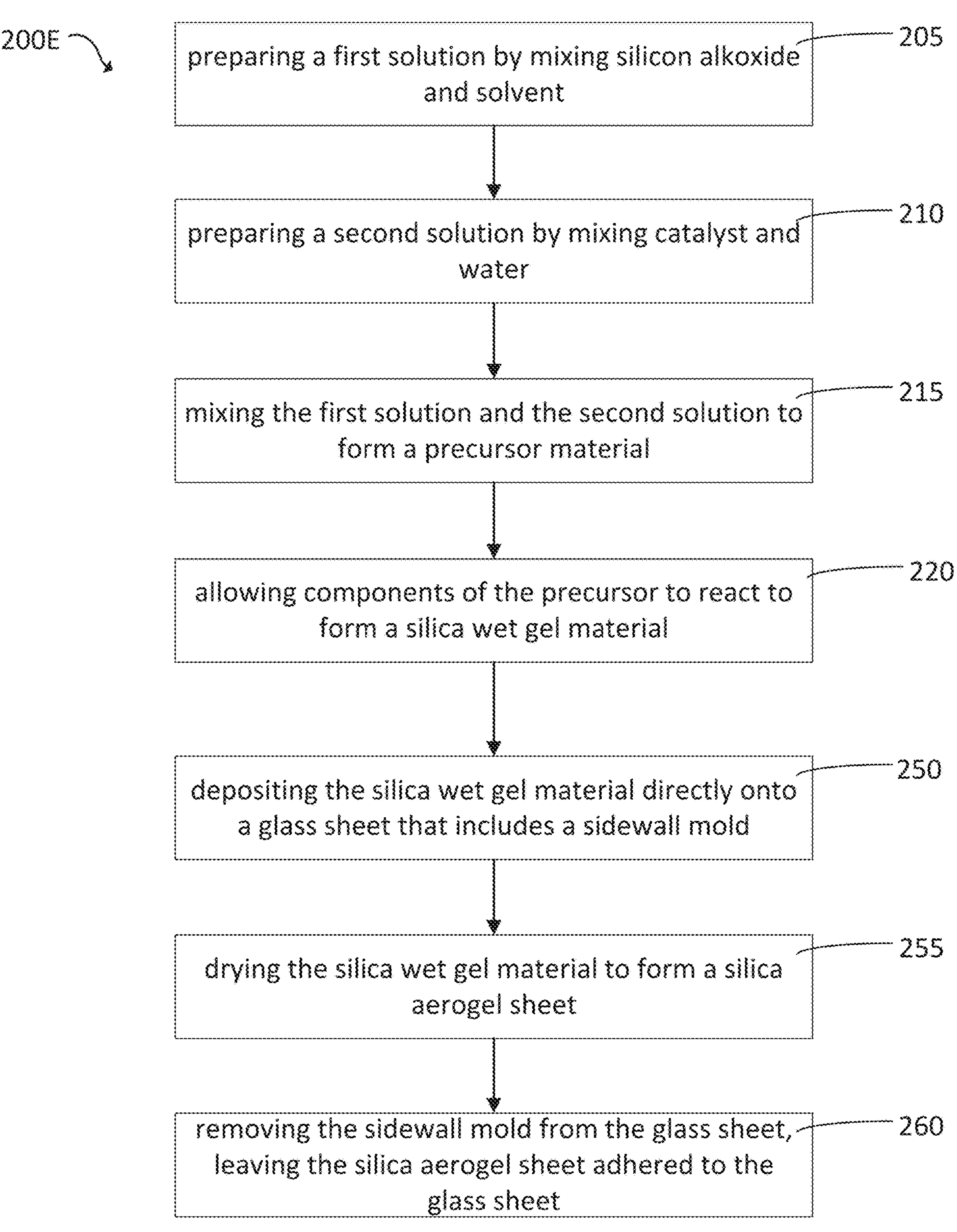
FIG. 7 is a flow chart depicting another method of making an article having a glass sheet and a silica aerogel sheet in accordance with certain embodiments.

FIG. 7 illustrates the method 200E of forming a silica aerogel sheet directly onto a substrate using a sidewall mold. The method 200E comprises steps 205 through 220 of forming silica wet gel as described elsewhere herein, a step 250 of depositing the silica wet gel directly onto a glass sheet that includes a sidewall mold, a step 255 of drying the silica wet gel to form a silica aerogel sheet, and a step 260 of removing the sidewall mold from the glass sheet, leaving the silica aerogel sheet adhered to the glass sheet.

Figure 8:
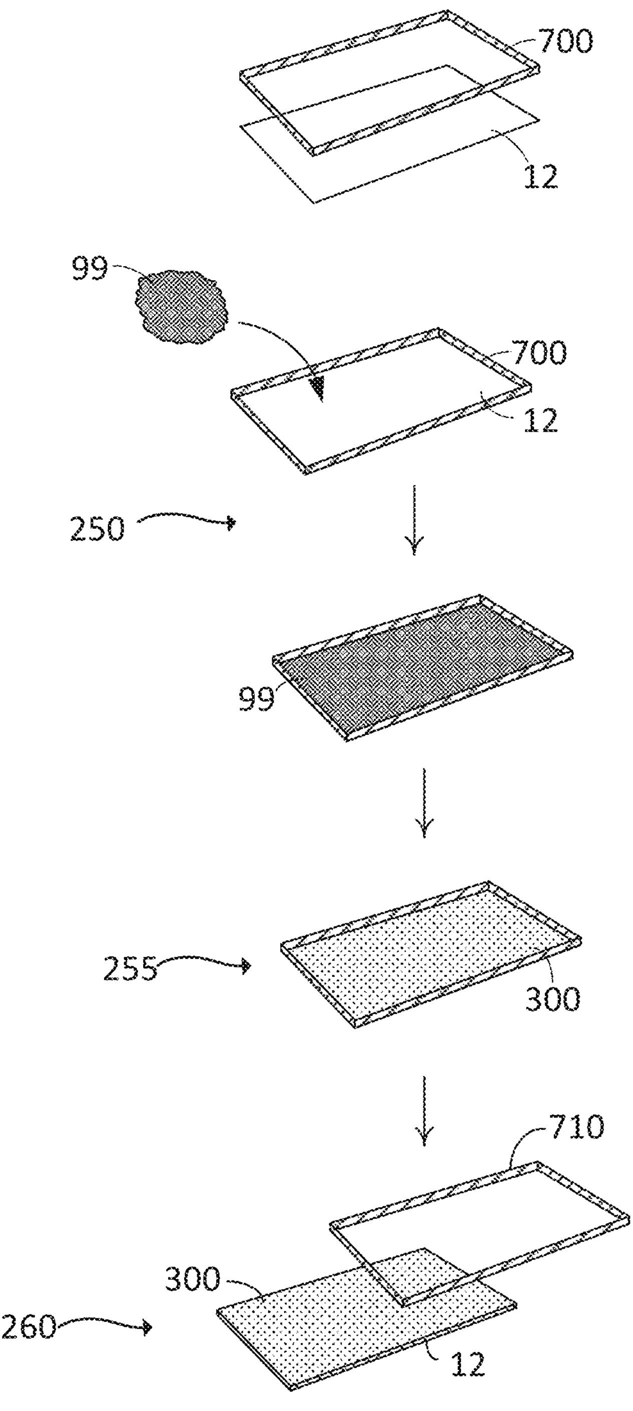
FIG. 8 illustrates perspective views of a sidewall mold being used in a method of making a silica aerogel sheet according to certain embodiments.

FIG. 8 illustrates the method 200E of forming a silica aerogel sheet using the sidewall mold 700. The sidewall mold 700 includes a plurality of sidewalls 710 but is devoid of a base. The sidewall mold 700 has dimensions that generally surround a perimeter of a glass sheet 12. First, the sidewall mold 700 is positioned around the perimeter or on top of the glass. Next, at step 250, silica wet gel 99 is poured onto the glass substrate 12 and is held in place by the sidewall mold 700. At step 255, the silica wet gel 99 is dried using any conventional drying method described herein to form a silica aerogel sheet 300 having a size and dimension defined by the sidewall mold 700. At step 260, the sidewall mold 700 is removed from the substrate 12, thereby leaving a dried silica aerogel sheet 300 adhered to the substrate 12.

Thus, the aerogel fabrication method can include various techniques, such as method 200D shown in FIG. 5 and described with reference thereto, or method 200E as shown in FIG. 7 and described with reference thereto. Another option is to use a rapid supercritical extraction technique. Reference is made to U.S. Pat. No. 8,080,591, the salient teachings of which are incorporated herein by reference.

Figure 9:
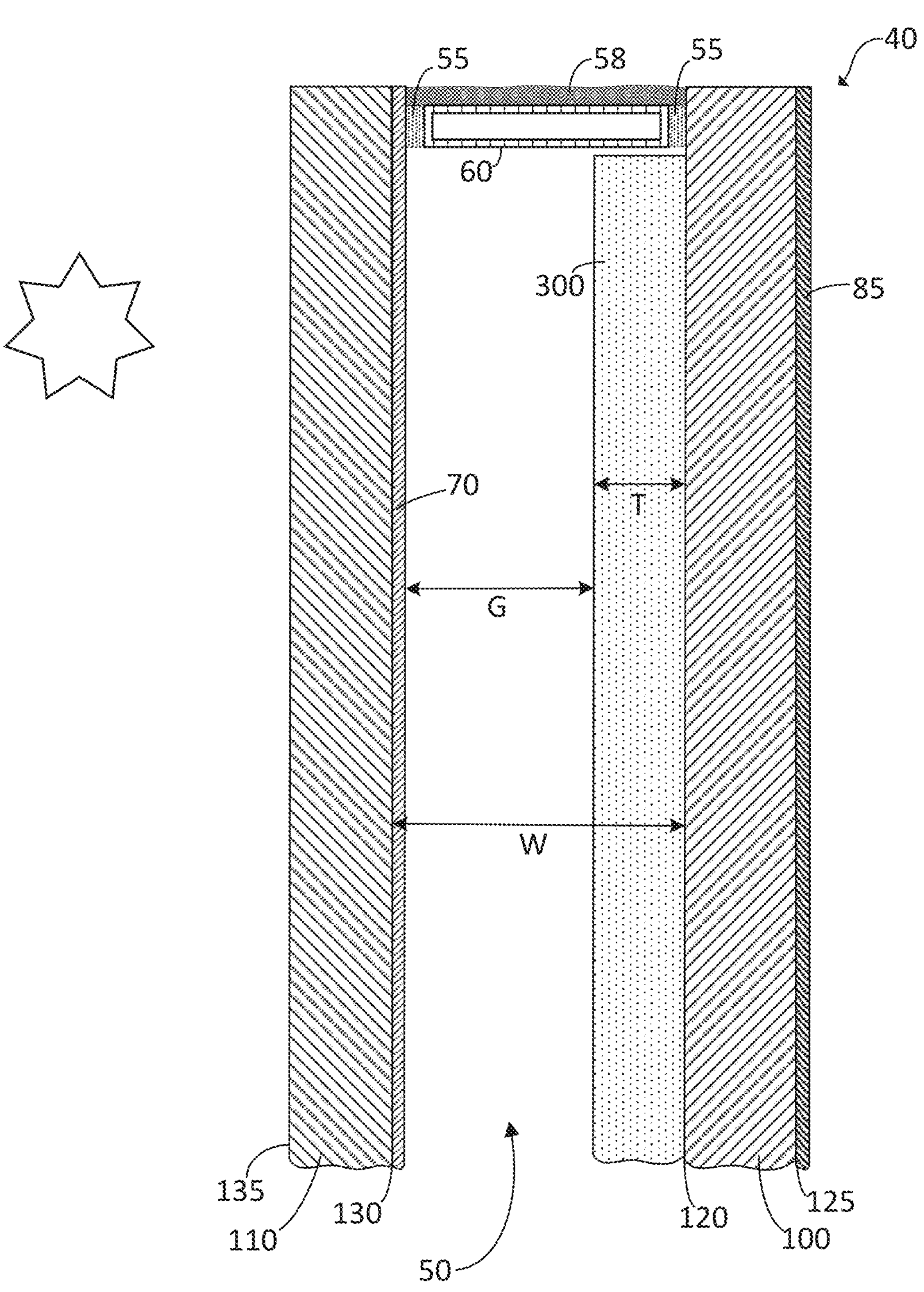
FIG. 9 is a schematic, partially broken-away, cross-sectional side view of an insulating glazing unit in accordance with certain embodiments.

Some embodiments provide an insulating glazing unit. FIG. 9 illustrates an insulating glazing unit 40 according to certain embodiments comprising a first glass sheet 100, a second glass sheet 110 and a between-pane space 50. The between-pane space 50 is located between the two glass sheets. The glass sheets 100, 110 can have any of the features described for a glass sheet elsewhere herein. In alternative embodiments, one or both glass sheets 100, 110 are replaced with sheets formed of a polymer, such as polycarbonate, acrylic or PVC. Various other polymer materials may be used in such alternative embodiments. The insulating glazing unit further comprises a silica aerogel sheet 300 within the between-pane space 50. The silica aerogel sheet 300 can have any of the features and properties described elsewhere herein.

In some cases, the silica aerogel sheet 300 is a single aerogel sheet. In such cases, there is only one silica aerogel sheet 300 in the between-pane space 50. The single aerogel sheet 300 can, for example, have a major dimension (e.g., a length or width) of at least 0.375 meter, preferably at least about 0.75 meter, or in some cases at least about 1.125 meters (e.g., between about 1.5 meters and about 3 meters).

In other cases, the silica aerogel sheet 300 comprises plurality of silica aerogel sheets. In such cases, there are a plurality of silica aerogel sheets in the between-pane space 50. A plurality of aerogel sheets may thus collectively define the silica aerogel sheet 300. When multiple aerogel sheets are used, they can be arranged in a tiled configuration between the two glass panes 100, 110. When a tiled configuration is used, multiple aerogel sheets preferably are arranged in a non-overlapping manner so as to cover a majority (i.e., greater than 50%, preferably at least 75%) of the area of an adjacent interior glass surface 120, 130.

Whether the silica aerogel sheet 300 is formed by one or multiple aerogel sheets, it preferably covers more than 60% (e.g., more than 70%, more than 80%, or even more than 90%) of an adjacent interior glass surface 120, 130. A coverage within any one or more (e.g., all) of these ranges can optionally be used in any embodiment of the present disclosure. In preferred embodiments, the silica aerogel sheet 300 consists of a single aerogel sheet. This can optionally be the case for any embodiment of the present disclosure involving a silica aerogel sheet.

When the silica aerogel sheet 300 comprises a plurality of aerogel sheets, those sheets can have any desired shape and tiling arrangement. As non-limiting examples, the aerogel sheets can be square, rectangular, or hexagonal in shape. In some embodiments, edges of each aerogel sheet are aligned both vertically and horizontally with edges of adjacent aerogel sheets. Reference is made to U.S. patent application Ser. No. 17/390,178, the teachings of which relating to aerogel sheet tiling arrangements are hereby incorporated by reference.

When multiple silica aerogel sheets are provided in a tiling arrangement, the size of the silica aerogel sheets is not particularly limited. In some cases, all of the silica aerogel sheets have the same dimensions. In other cases, some of the silica aerogel sheets have different dimensions (e.g., a greater length) compared to some of the other silica aerogel sheets. Preferably, each of the silica aerogel sheets has a length and a width of at least 10 cm. For each of the silica aerogel sheets, the length, the width, or both are preferably less than 1 meter. Such dimensions allow the silica aerogel sheets to be scaled-up so as to cover large areas between two glass sheets of an insulating glazing unit, while still allowing the silica aerogel sheets to be dried using a small high-pressure vessel. Larger or smaller silica aerogel sheets may alternatively be used.

In certain embodiments, the between-pane space 50 contains a gaseous atmosphere, preferably comprising a thermally insulative gas, such as argon, krypton, or both. In some cases, the gaseous atmosphere comprises a mix of argon and air (e.g., 90% argon and 10% air). In other cases, the gaseous atmosphere comprises a mix of krypton and air. In still other cases, the gaseous atmosphere comprises a mix of argon, krypton, and air. In yet other cases, the gaseous atmosphere is just air.

In certain cases, a gas gap G is provided in the between-pane space 50 alongside the silica aerogel sheet 300. In some cases, the gas gap G can have a width in a range of from 9 to 14 mm and it contains a gaseous atmosphere comprising argon, air, or both. In certain cases, between-pane space has a width W in a range of from 14 to 21 mm, the gaseous atmosphere comprises argon, and the width of the gas gap G is from 10.5 to 13.5 mm. Reference is made to U.S. patent application Ser. No. 17/389,603, the teachings of which relating to gas gap and between-pane space configurations are hereby incorporated by reference.

Certain embodiments include a spacer 60 between the two glass sheets 100, 110. The spacer 60 may be a conventional metal channel spacer, e.g., formed of stainless steel or aluminum. Or it can comprise polymer and metal, or just polymer (e.g., foam). The spacer can alternatively be an integral part of a sash, frame, etc. so as to maintain the IG unit in the desired configuration.

The spacer 60 can be adhered to the two glass sheets 100, 110 by one or more beads of sealant as is conventional and well-known to skilled artisans. In FIG. 9, the spacer 60 is shown with a primary sealant 55 on opposite sides of the spacer 60 and a secondary sealant 58 provided on an outside wall of the spacer 60. Another option is to omit the secondary sealant and provide a single deposit of sealant along both sides of the spacer and on the outside wall of the spacer. Various other known sealant arrangements/systems can alternatively be used. In other cases, the spacer may be omitted while one or more beads of sealant (optionally together with a moisture vapor barrier) are provided about the perimeter of the unit so as to encompass the silica aerogel sheet 300.

In some embodiments, the silica aerogel sheet 300 does not contact the spacer 60. For example, the aerogel sheet 300 may be separated (i.e., spaced-apart) from the spacer 60 by about 1 mm to about 5 mm (e.g., about 2-4 mm, such as about 3 mm). When provided, the sealant 55, 58 between the spacer 60 and the two adjacent glass sheets 100, 110 can also be spaced from the silica aerogel sheet 300.

The first glass sheet 100 has opposed surfaces 120, 125, which preferably are opposed major surfaces (or "opposed faces"). Similarly, the second glass sheet 110 has opposed surfaces 130, 135, which preferably are opposed major surfaces. In some cases, surfaces 120 and 130 are interior surfaces facing a between-pane space 50, while surfaces 125 and 135 are exterior surfaces, e.g., such that surface 135 is an exterior surface exposed to an outdoor environment (and thus exposed to periodic contact with rain). This, however, is not required.

In some embodiments, the second glass sheet 110 is an outboard pane that defines both a #1 surface (i.e., surface 135) and a #2 surface (i.e., surface 130), while the first glass sheet 100 is an inboard pane that defines both a #3 surface (i.e., surface 120) and a #4 surface (i.e., surface 125). The IG unit 40 can optionally be mounted in a frame such that the #1 surface is exposed to an outdoor environment, while the #4 surface is exposed to an indoor environment (e.g., an environment inside a building).

The silica aerogel sheet 300 can be adhered to or otherwise mounted alongside either the #2 surface or the #3 surface of the insulating glazing unit 40. Another option is to have aerogel sheets on both the #2 and the #3 surfaces. FIG. 9 illustrates just one embodiment where the silica aerogel sheet 300 is adhered to an interior surface 120 (e.g., the #3 surface) of the first glass sheet 100.

While FIG. 9 shows a double-pane insulating glazing unit, other embodiments provide a triple-pane insulating glazing unit having a silica aerogel sheet 300 on the #2 surface, the #3 surface, the #4 surface, or the #5 surface. In triple-pane embodiments, silica aerogel sheets can optionally be provided on both the #3 surface and either the #4 or #5 surface. Another option is to provide silica aerogel sheets on both the #2 surface (e.g., for applications where a low-emissivity or solar control coating is on the #3 surface) and the #4 or #5 surface. In one preferred group of embodiments, however, the insulating glazing unit 40 includes only two glass panes 100, 110 and only one between-pane space 50.

The silica aerogel sheet 300 has a thickness T. In some embodiments, the silica aerogel sheet 300 has a thickness in a range of from 1.5 mm to 15 mm, such as greater than 2 mm but less than 8 mm, or from 2 mm to 4 mm (e.g., 3 mm). It is to be appreciated, however, that other thicknesses can be used.

The between-pane space 50 has a thickness W, which is measured from the interior surface 130 of the second glass pane 110 to the interior surface 120 of the first glass pane 100. In certain embodiments, the silica aerogel sheet 300 does not occupy the entire thickness W of the between-pane space 50. In other cases, the silica aerogel sheet occupies the entire thickness of the between-pane space.

A ratio of the thickness T of the silica aerogel sheet 300 to the thickness W of the between-pane space 50 preferably is between 0.15 and 0.85. In some embodiments, the thickness W of the between-pane space 50 is at least 10 mm, optionally together with the thickness of the silica aerogel sheets 300 being greater than 2 mm but less than 8 mm. In certain preferred embodiments, the aerogel sheet 300 occupies less than 50% of the thickness W of the between-pane space 50 (e.g., less than 45%, less than 40%, or even less than 35% of the thickness W of the between-pane space 50).

In other embodiments, the silica aerogel sheet 300 occupies a majority of the thickness W of the between-pane space 50. In such instances, the thickness T of the silica aerogel sheet 300 preferably is greater than 8 mm but less than 15 mm (e.g., about 10 mm), while the thickness of the gas gap G alongside the silica aerogel sheet 300 is optionally less than 5 mm (e.g., about 3 mm).

Certain embodiments provide an insulating glazing unit 40 that includes both a silica aerogel sheet 300 and a low-emissivity coating 70. In some cases, the silica aerogel sheet 300 is provided on an interior surface of one glass sheet and the low-emissivity coating 70 is provided on an interior surface of the other glass sheet. FIG. 9 illustrates an embodiment that includes a silica aerogel sheet 300 on a #3 surface (i.e., surface 120) and an optional low-emissivity coating 70 on a #2 surface (i.e., surface 130). In another embodiment, a silica aerogel sheet is provided on a #2 surface (i.e., surface 130) and an optional low-emissivity coating is provided on a #3 surface (i.e., surface 120).

When provided, the optional low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. Patent and Application Nos. Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating can be a "single silver" or "double silver" low-emissivity coating, which are well-known to skilled artisans. Advantageous coatings of this nature are commercially available from, for example, Cardinal CG Company (Eden Prairie, Minnesota, U.S.A.).

Certain embodiments provide an insulating glazing unit 40 that includes both a silica aerogel sheet 300 and an optional transparent conductive oxide coating 85. In some cases, the silica aerogel sheet 300 is provided on an interior surface of a glass sheet and a transparent conductive oxide coating 85 is provided on an exterior surface of a glass sheet. FIG. 9 illustrates an embodiment where the silica aerogel sheet 300 is provided on a #3 surface (i.e., surface 120) and an optional transparent conductive oxide coating 85 is provided on a #4 surface (i.e., surface 125).

When provided, the optional transparent conductive oxide coating 85 can include indium tin oxide. In alternate embodiments, zinc aluminum oxide, SnO:Sb, sputtered SnO:F, or another known transparent conductive oxide is used. In some cases, transparent conductive oxide coating 85 comprises tin oxide together with antimony, fluorine, or another dopant. Further, in some cases, the transparent conductive oxide coating 85 is a sputtered film. In other embodiments, the transparent conductive oxide coating 85 comprises a pyrolytic film that includes tin (e.g., comprising tin oxide together with antimony, fluorine, or another dopant). Also, in some cases, the transparent conductive oxide coating 85 includes carbon nanotubes.

Preferably, the transparent conductive oxide coating 85 is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 85 is provided, it can optionally comprise a transparent conductive oxide film having a thickness of from 1,000 Å to 1,750 Å.

The transparent conductive oxide coating 85 can, for example, be a coating of the type described in any of U.S. Patent or Patent Application Nos. U.S. Pat. No. 9,862,640 or 10,000,965 or 10,000,411 or Ser. No. 16/740,006, the teachings of which concerning the transparent conductive oxide coating are hereby incorporated herein by reference. In the embodiment of FIG. 9, the illustrated transparent conductive oxide coating 85 can optionally be omitted.

In some cases, the insulating glazing unit 40 includes both a transparent conductive oxide coating 85 and a low-emissivity coating 70. This, however, is not required in all embodiments. For example, in some cases, the insulating glazing unit 40 includes the low-emissivity coating 70 but is devoid of the transparent conductive oxide coating 85.

Other embodiments provide a method of making an insulating glazing unit. The method can include either method 200D shown in FIG. 5 or method 200E as shown in FIG. 7 of making a glass sheet bearing a silica aerogel sheet. The method further comprises an additional step of assembling the silica aerogel sheet together with the first and second glass sheets 100, 110 in forming the insulating glazing unit. Exemplary IG unit assembly methods are described in U.S. Patent Application No. 63/480,715, the contents of which are incorporated herein by reference. More generally, the silica aerogel sheet 300 and the first and second glass sheets 100, 110 glass can be assembled as part of an insulating glazing unit using any suitable techniques.

In cases where method 200D is used, the step of assembling the silica aerogel sheet as part of an insulating glazing unit can include a step of adhering the silica aerogel sheet to a surface of a glass sheet (e.g., through van der Waals forces, or by using an optical adhesive). The silica aerogel sheet may be placed either manually or, more preferably, with robotics. In some embodiments, the silica aerogel sheet is adhered to a temporary surface for handling and placement. The silica aerogel sheet can be picked up using electrostatic adhesion, e.g., using commercially available Stackit robots manufactured by Grabit, Inc. (Sunnyvale, California, U.S.A.) or using technology described in U.S. Patent Application No. 63/387,442, the contents of which are incorporated herein by reference.

Figure 10:
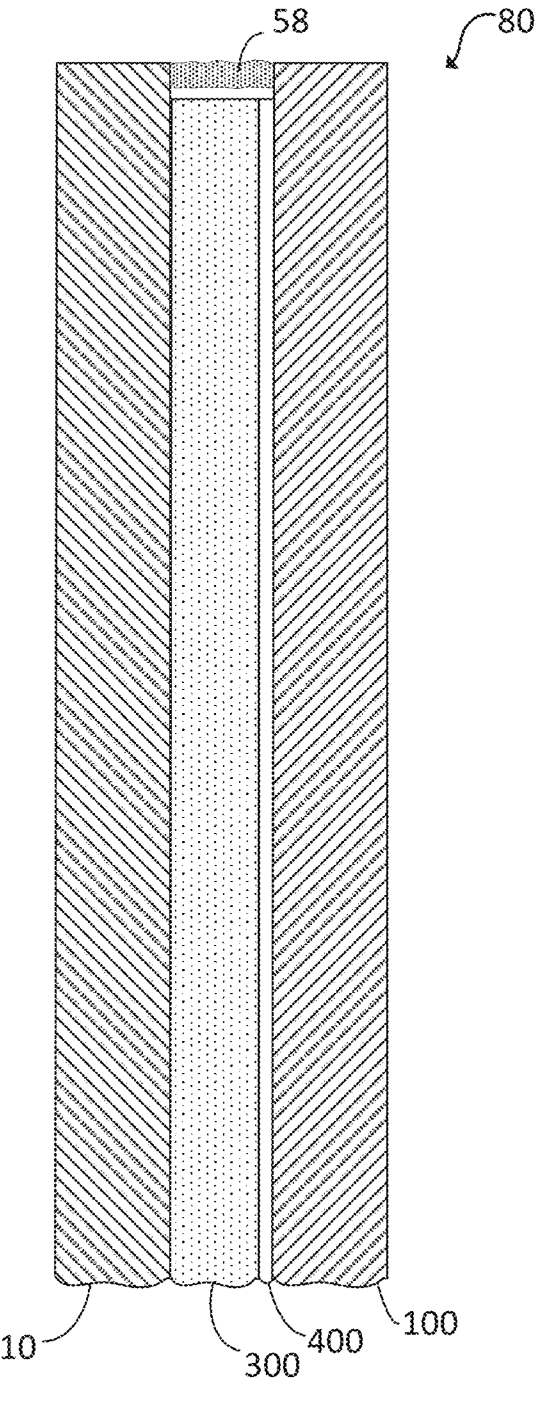
FIG. 10 is a schematic, partially broken-away, cross-sectional side view of a laminated glass assembly in accordance with certain embodiments.

Certain embodiments provide a laminated glass assembly. FIG. 10 illustrates a laminated glass assembly 80 comprising a first glass sheet 100, a second glass sheet 110 and a silica aerogel sheet 300. In some embodiments, the laminated glass assembly 80 also includes a spacer. In other cases, as shown in FIG. 10, the spacer is omitted and the laminated glass assembly 80 just has one or more beads of sealant 58 (optionally together with a foil moisture barrier, tape, or both) at the perimeter of the assembly.

The silica aerogel sheet 300 can have any of the features and properties discussed elsewhere herein. Likewise, the silica aerogel sheet 300 of the laminated glass assembly 80 can have the same dimensions and material properties as the silica aerogel sheet 300 described elsewhere herein for the insulating glazing unit 40.

The laminated glass assembly 80 can also include a polymer interlayer 400. The polymer interlayer 400 preferably is a tear-resistant polymer layer. In some cases, it is a sheet of ionoplast plastic. In other cases, it is a sheet of polyvinyl butyral (PVB). Various other materials known to be suitable for the interlayer of a laminated glass panel can also be used. In certain embodiments, both glass sheets 100, 110 can be clear 3 mm soda-lime float glass and the polymer interlayer 400 can be 0.30-inch thick PVB. It is to be appreciated, however, that these details are by no means limiting.

FIG. 10 shows an embodiment having a single polymer interlayer 400. In such embodiments, the silica aerogel sheet 300 can be adhered directly to one of the two glass sheets 100, 110 (e.g., through van der Waals forces, or by using an optical adhesive). In other embodiments, there are two polymer interlayers. In such embodiments, the silica aerogel sheet is sandwiched between, and laminated to, the two polymer interlayers. In such cases, the polymer interlayers are each in contact with one of the glass sheets on opposite sides of the silica aerogel sheet. In still other embodiments, the polymer interlayer(s) are omitted, and the silica aerogel sheet replaces the interlayer(s).

Other embodiments provide a method of making a laminated glass assembly. Here too, the method can include either method 200D shown in FIG. 5 or method 200E as shown in FIG. 7 of making a glass sheet bearing a silica aerogel sheet. The method further comprises an additional step of assembling the silica aerogel sheet 300 together with the first and second glass sheets 100, 110 in forming the laminated glass assembly. The silica aerogel sheet 300 and the two glass sheets 100, 110 can then be assembled together in forming the laminated glass assembly using suitable techniques.

In cases where method 200D is used, the step of assembling the silica aerogel sheet as part of a laminated glass assembly can include a step of adhering the silica aerogel sheet to a surface of a glass sheet (e.g., through van der Waals forces, or by using an optical adhesive) as described elsewhere herein. The silica aerogel sheet and glass sheet can then be assembled as part of a laminated glass assembly, using any suitable techniques. In some cases, the assembly process includes one or more steps described in U.S. Pat. Nos. 7,117,914 and 7,143,800, the teachings of which are hereby incorporated herein by reference.

While some preferred embodiments of the invention have been described, it should be understood that various changes, adaptations and modifications may be made therein without departing from the spirit of the invention and the scope of the appended claims.

We claim:

1. A method of making silica wet gel comprising the steps of:

preparing a first solution by mixing methyl silicate 51 and methanol, wherein the first solution consists essentially of the methyl silicate 51 and the methanol, and wherein the methyl silicate 51 has a weight percent of greater than or equal to 15% and less than or equal to 30% and the methanol has a weight percent of greater than or equal to 60% and less than or equal to 90%;

preparing a second solution by mixing ammonium hydroxide and water, wherein the second solution consists essentially of the ammonium hydroxide and the water, and wherein the ammonium hydroxide has a weight percent of greater than or equal to 0.5% and less than or equal to 1% and the water has a weight percent of greater than or equal to 99% and less than 100%;

mixing the first solution and the second solution together to form a precursor material; and allowing components in the precursor material to react to form silica wet gel.

2. The method of claim 1 wherein the precursor material consists essentially of:

methyl silicate 51 at a weight percent of greater than or equal to 15% and less than or equal to 24%;

methanol at a weight percent of greater than or equal to 60% and less than or equal to 68%;

water at a weight percent of greater than or equal to 15% and less than or equal to 17%; and ammonium hydroxide at a weight percent of greater than or equal to 0.08% and less than or equal to 0.2%.

3. The method of claim 2 wherein the precursor material consists essentially of:

methyl silicate 51 at a weight percent of greater than or equal to 15.28% and less than or equal to 19%;

methanol at a weight percent of greater than or equal to 65.16% and less than or equal to 68.52%;

water at a weight percent of greater than or equal to 15.68% and less than or equal to 16.04%; and ammonium hydroxide at a weight percent of greater than or equal to 0.15% and less than or equal to 0.17%.

4. The method of claim 1 wherein the precursor material has a weight percent ratio of the methyl silicate 51:water of between 0.25:1 and 2:1.

5. The method of claim 4 wherein the weight percent ratio of the methyl silicate 51:water for the precursor material is between 0.5:1 and 1:1.

6. A method of making a silica wet gel comprising the steps of:

preparing a first solution by mixing methyl silicate 51 and methanol;

preparing a second solution by mixing ammonium hydroxide and water;

mixing the first solution and the second solution together to form a precursor material, such that the precursor material consists essentially of:

methyl silicate 51 at a weight percent of greater than or equal to 15% and less than or equal to 24%;

methanol at a weight percent of greater than or equal to 60% and less than or equal to 68%;

water at a weight percent of greater than or equal to 15% and less than or equal to 17%; and ammonium hydroxide at a weight percent of greater than or equal to 0.08% and less than or equal to 0.2%; and allowing components in the precursor material to react to form the silica wet gel.

7. The method of claim 6 wherein the precursor material consists essentially of:

methyl silicate 51 at a weight percent of greater than or equal to 15.28% and less than or equal to 19%;

methanol at a weight percent of greater than or equal to 65.16% and less than or equal to 68.52%;

water at a weight percent of greater than or equal to 15.68% and less than or equal to 16.04%; and ammonium hydroxide at a weight percent of greater than or equal to 0.15% and less than or equal to 0.17%.

8. The method of claim 6 wherein the precursor material has a weight percent ratio of the methyl silicate 51:water of between 0.25:1 and 2:1.

9. The method of claim 8 wherein the weight percent ratio of the methyl silicate 51:water for the precursor material is between 0.5:1 and 1:1.

10. The method of claim 1 further comprising drying the silica wet gel to form silica aerogel in the form of an aerogel sheet having a thickness in a range of from 1.5 mm to 15 mm, and adhering the aerogel sheet to a surface of a glass sheet.

11. The method of claim 10 wherein the glass sheet is part of a window.

12. The method of claim 1 further comprising drying the silica wet gel to form silica aerogel in the form of an aerogel sheet having a thickness in a range of from 1.5 mm to 15 mm, and assembling the aerogel sheet together with first and second glass sheets to form an insulating glazing unit.

13. The method of claim 1 wherein the precursor material is devoid of N,N-dimethylformamide.

14. The method of claim 6 further comprising drying the silica wet gel to form silica aerogel in the form of an aerogel sheet having a thickness in a range of from 1.5 mm to 15 mm, and adhering the aerogel sheet to a surface of a glass sheet.

15. The method of claim 14 wherein the glass sheet is part of a window.

16. The method of claim 6 further comprising drying the silica wet gel to form silica aerogel in the form of an aerogel sheet having a thickness in a range of from 1.5 mm to 15 mm, and assembling the aerogel sheet together with first and second glass sheets to form an insulating glazing unit.

17. The method of claim 6 wherein the precursor material is devoid of N,N-dimethylformamide.

* * * * *